(12) United States Patent
Hayashi et al.

(10) Patent No.: US 7,646,287 B2
(45) Date of Patent: Jan. 12, 2010

(54) ANTITHEFT SYSTEM FOR VEHICLE

(75) Inventors: Michitaka Hayashi, Nagoya (JP); Masamoto Kawaguchi, Kariya (JP); Kenji Hirano, Kariya (JP)

(73) Assignee: DENSO CORPORATION, Kariya (JP)

( * ) Notice: Subject to any disclaimer, the term of this patent is extended or adjusted under 35 U.S.C. 154(b) by 477 days.

(21) Appl. No.: 11/585,343

(22) Filed: Oct. 24, 2006

(65) Prior Publication Data

US 2007/0103279 A1    May 10, 2007

(30) Foreign Application Priority Data

Oct. 24, 2005 (JP) ............................ 2005-308529
Nov. 18, 2005 (JP) ............................ 2005-334642
Nov. 29, 2005 (JP) ............................ 2005-343588
Aug. 3, 2006 (JP) ............................ 2006-212300

(51) Int. Cl.
    *B60R 25/10* (2006.01)
(52) U.S. Cl. ............... 340/429; 340/426.1; 340/426.25
(58) Field of Classification Search ............ 340/429, 340/426.25, 426.1, 426.13, 440, 426.3, 9; 73/652; 180/287; 307/10.2
    See application file for complete search history.

(56) References Cited

U.S. PATENT DOCUMENTS

| 3,728,685 | A | * | 4/1973 | Stalnert ........................ 353/26 A |
| 4,359,717 | A | * | 11/1982 | Huber et al. ...................... 340/429 |
| 4,651,128 | A | | 3/1987 | Kolb |
| 4,741,206 | A | * | 5/1988 | Ishiguro et al. ..................... 73/117.01 |
| 5,155,467 | A | * | 10/1992 | Matsubara .................. 340/429 |
| 5,274,364 | A | * | 12/1993 | Li et al. ........................ 345/627 |
| 6,028,505 | A | * | 2/2000 | Drori ..................... 340/426.17 |
| 6,150,927 | A | * | 11/2000 | Nesbitt ................... 340/426.25 |
| 6,157,295 | A | * | 12/2000 | Steiner et al. ............... 340/440 |
| 6,445,085 | B1 | * | 9/2002 | Toda et al. ................. 307/10.8 |
| 6,791,456 | B2 | * | 9/2004 | Nakayama et al. .......... 340/429 |
| 6,856,044 | B2 | | 2/2005 | Ries-Mueller |
| 7,031,852 | B2 | | 4/2006 | Kato |
| 2002/0039951 | A1 | | 4/2002 | Hasegawa |
| 2002/0109408 | A1 | * | 8/2002 | Ries-Mueller ............. 307/10.2 |
| 2004/0195022 | A1 | * | 10/2004 | Inoue ........................ 180/170 |
| 2004/0212686 | A1 | * | 10/2004 | Usami .................... 348/208.99 |
| 2004/0217849 | A1 | * | 11/2004 | Maehara .................. 340/426.1 |

(Continued)

FOREIGN PATENT DOCUMENTS

DE    198 25 817    9/1999

(Continued)

OTHER PUBLICATIONS

Examination Report from Great Britain Patent Office issued on Feb. 14, 2007 for the corresponding Great Britain patent application No. GB0621153.6.

(Continued)

*Primary Examiner*—Davetta W Goins
*Assistant Examiner*—Hoi C Lau
(74) *Attorney, Agent, or Firm*—Posz Law Group, PLC

(57) ABSTRACT

An antitheft apparatus for a vehicle has an inertia sensor, which is also used for an anti-lock braking system. An electronic control unit receives output signals from the inertia sensor and determines a possible vehicle theft when a detected vehicle condition (for example, vehicle acceleration) is larger than a threshold value.

14 Claims, 24 Drawing Sheets

U.S. PATENT DOCUMENTS

| | | | |
|---|---|---|---|
| 2006/0028060 A1* | 2/2006 | Kuramochi et al. | 303/89 |
| 2006/0089771 A1* | 4/2006 | Messih et al. | 701/45 |
| 2006/0244576 A1* | 11/2006 | Sugie et al. | 340/429 |
| 2006/0244577 A1* | 11/2006 | Tanaka et al. | 340/429 |

FOREIGN PATENT DOCUMENTS

| | | |
|---|---|---|
| DE | 199 62 072 A1 | 6/2001 |
| DE | 101 56 425 | 5/2003 |
| EP | 1 312 520 A3 | 5/2003 |
| EP | 1 413 853 | 4/2004 |
| JP | A-9-292248 | 11/1997 |
| JP | A-11-257981 | 9/1999 |
| JP | A-2003-034233 | 2/2003 |
| JP | A-2003-132441 | 5/2003 |
| JP | A-2003-182526 | 7/2003 |
| JP | B2-3622723 | 12/2004 |
| JP | A-2005-247075 | 9/2005 |
| JP | A-2005-283290 | 10/2005 |

OTHER PUBLICATIONS

Office Action dated Apr. 16, 2008 in corresponding German Patent Application No. 10 200 604 9904.2-51 (and English translation).

\* cited by examiner

FIG. 24

| MODE | DETERMINATION ELEMENTS | | | PARKING PLACE | CONDITION FOR WARNING |
|---|---|---|---|---|---|
| OFF | | | | NO PROCESS IS CARRIED OUT FOR VEHICLE THEFT DETERMINATION | |
| 1 | gxl | γh | | SMALL VIBRATION FROM ROAD SURFACE | SMALL VIBRATION BUT LARGE CHANGE OF VEHICLE DIRECTION |
|   | gxl | gxh | |  | LARGE VIBRATION |
| 2 | gxh | γh | | LARGE VIBRATION FROM ROAD SURFACE | JACKED UP AND SWUNG |
| 3 | gxl | γl | | ERRONEOUS WARNING SHOULD BE AVOIDED, E.G. IN RESIDENTIAL AREA | STOLEN AND TRANSPORTED |
|   | gxl | γl | γh |  |  |
|   | gxl | γl | gxh |  |  |

ANTITHEFT SYSTEM FOR VEHICLE

CROSS REFERENCE TO RELATED APPLICATION

This application is based on Japanese Patent Application Nos. 2005-308529 filed on Oct. 24, 2005, 2005-343588 filed on Nov. 29, 2005, 2005-334642 filed on Nov. 18, 2005, and 2006-212300 filed on Aug. 3, 2006, the disclosures of which are incorporated herein by reference.

FIELD OF THE INVENTION

The present invention relates to an antitheft apparatus for a vehicle.

BACKGROUND OF THE INVENTION

An automotive antitheft system has been put to practical use, so that a vehicle is protected against theft which could be otherwise carried out by break-in, breakage of window glass, or jack-up, and so on. Such a conventional antitheft system is known in the art, for example, as disclosed in Japanese Patent Publication No. 2003-34233. An automotive antitheft system is practically used to protect the vehicle against the theft by the jack-up, wherein an inclination sensor is provided such that a detecting axis of the inclination sensor (an acceleration sensor) is arranged in parallel to the ground surface in order to detect an inclination of the vehicle by detecting gravitational acceleration.

Recently, demand for the automotive antitheft system having the inclination sensor is increasing. In some cases for the insurance against the theft, the automotive antitheft system is necessary to be installed in the vehicle.

However, various kinds of components and parts are necessary to be mounted in the vehicle, when the antitheft system having the inclination sensor is installed. Accordingly, a mounting space for such system becomes necessary, in addition to the increase of a business investment.

An inclination sensor to be mounted in an automotive vehicle is known in the art, for example, as disclosed in Japanese Patent No. 3622723. According to such a conventional inclination sensor, two detecting elements are provided in the vehicle, such that each of the detecting elements detects the respective inclinations of the vehicle in a longitudinal direction and a cross direction of the vehicle. As a result, the inclination sensor detects the inclination of the vehicle.

For example, as shown in FIGS. 30A and 30B, the inclination sensor 310 is mounted in an automotive vehicle 300, such that a detecting direction GF of one of the detecting elements is a longitudinal (forward and backward) direction (F-B direction), whereas a detecting direction GW of the other detecting element is a cross (left and right) direction (L-R direction) of the vehicle 300. In FIGS. 30A and 30B, letters F, B, L and R respectively designate the directions of the front, the back, the left, and the right of the vehicle. An acceleration sensor is used for the detecting elements.

In the above inclination sensor, an average amount of the acceleration in the F-B direction during a predetermined period is memorized as a reference value GFi, when the vehicle is parked in a normal condition. And an average amount of the acceleration in the L-R direction during the same predetermined period is likewise memorized as a reference value GWi. And current accelerations GF1 and GW1 in the F-B and L-R directions, which are periodically detected by the sensor, are respectively compared with the reference values GFi and GWi, and the inclined angle of the vehicle 300 is calculated by differences between the current accelerations and the reference values.

Since the differences between the current accelerations and the reference values, respectively correspond to horizontal components of the gravitational accelerations in case of the inclination of the vehicle, the inclined angle of the vehicle 300 can be calculated by such differences of the accelerations.

In the above conventional inclination sensor 310, however, the detecting elements detect the accelerations in the longitudinal (F-B) and cross (L-R) directions, individually, as mentioned above. The inclination of the vehicle 300 in the longitudinal direction, which occurs at a braking or accelerating the vehicle or when the vehicle is stolen by use of a tow truck, or the inclination of the vehicle in the cross direction, which occurs at turning the vehicle can be detected by only one of the detecting elements.

Accordingly, in the case that one of the detecting elements (e.g. the detecting element for the F-B direction) is deteriorated, the inclination of the vehicle can be detected by the other detecting element (detecting element for L-R direction) only in the cross direction. Therefore, it is a problem in the above case that detection accuracy is remarkably decreased.

Another antitheft system for a vehicle is disclosed, for example, in Japanese Patent No. 3622723, according to which various conditions of the vehicle are detected based on output from acceleration sensors to prevent a vehicle theft.

More exactly, the antitheft system of the above prior art has an acceleration detecting means for detecting accelerations in multiple directions of the vehicle, and a determining means for determining an abnormal condition to be caused by a possible vehicle theft based on the accelerations in the multiple directions. The determining means calculates offset values for the longitudinal and cross directions of the vehicle, wherein the offset values are obtained as average values of accelerations of the vehicle, which is in a parking (stable) condition, for a predetermined period. The determining means calculates difference values between the offset values and current accelerations, which are periodically detected, as effective accelerations. When the effective accelerations become higher than an allowable error, an integration for the effective accelerations is performed. Then, the determining means determines whether an integrated value exceeds a predetermined reference value, so that it can detect whether the vehicle has been moved or inclined.

In the above antitheft apparatus for the vehicle, however, it is not possible to detect the possible vehicle theft, when the vehicle is jacked up with such a small acceleration not exceeding the allowable error and carried away with such small acceleration. When the allowable error is made to be small, even a small swing of the vehicle caused by wind may be erroneously detected as the vehicle theft.

SUMMARY OF THE INVENTION

The present invention is made in view of the foregoing problems, and has an object to suppress the increase of the business investment and to provide an automotive antitheft system which requires a smaller space for mounting the antitheft system. The object of the invention is achieved by commonly using a part of another system as a part of the antitheft system.

It is another object of the invention to provide an inclination sensor to be mounted in an automotive vehicle, and a method for detecting an inclination of the vehicle, according to which the detection accuracy can be improved.

It is a further object of the present invention to provide an antitheft apparatus for a vehicle, in which an antitheft function is improved.

According to a feature of the invention, an antitheft apparatus for a vehicle has; an inertia sensor provided for an anti-lock braking system; an electronic control unit having a first control portion for determining whether there is a possible vehicle theft or not based on an output signal from the inertia sensor, and for outputting a vehicle theft signal when the first control portion determines the possible vehicle theft; a second control portion of the electronic control unit for receiving the vehicle theft signal from the first control unit portion, and for outputting a driving signal; and a warning device for raising an alarm indicating the possible vehicle theft, when the warning device receives the driving signal from the second control portion.

BRIEF DESCRIPTION OF THE DRAWINGS

The above and other objects, features and advantages of the present invention will become more apparent from the following detailed description made with reference to the accompanying drawings. In the drawings:

FIG. 24 is a table showing operational modes for the seventh embodiment;

DETAILED DESCRIPTION OF THE PREFERRED EMBODIMENTS

First Embodiment

An embodiment of the present invention will be explained with reference to the accompanying drawings.

Figure 1:
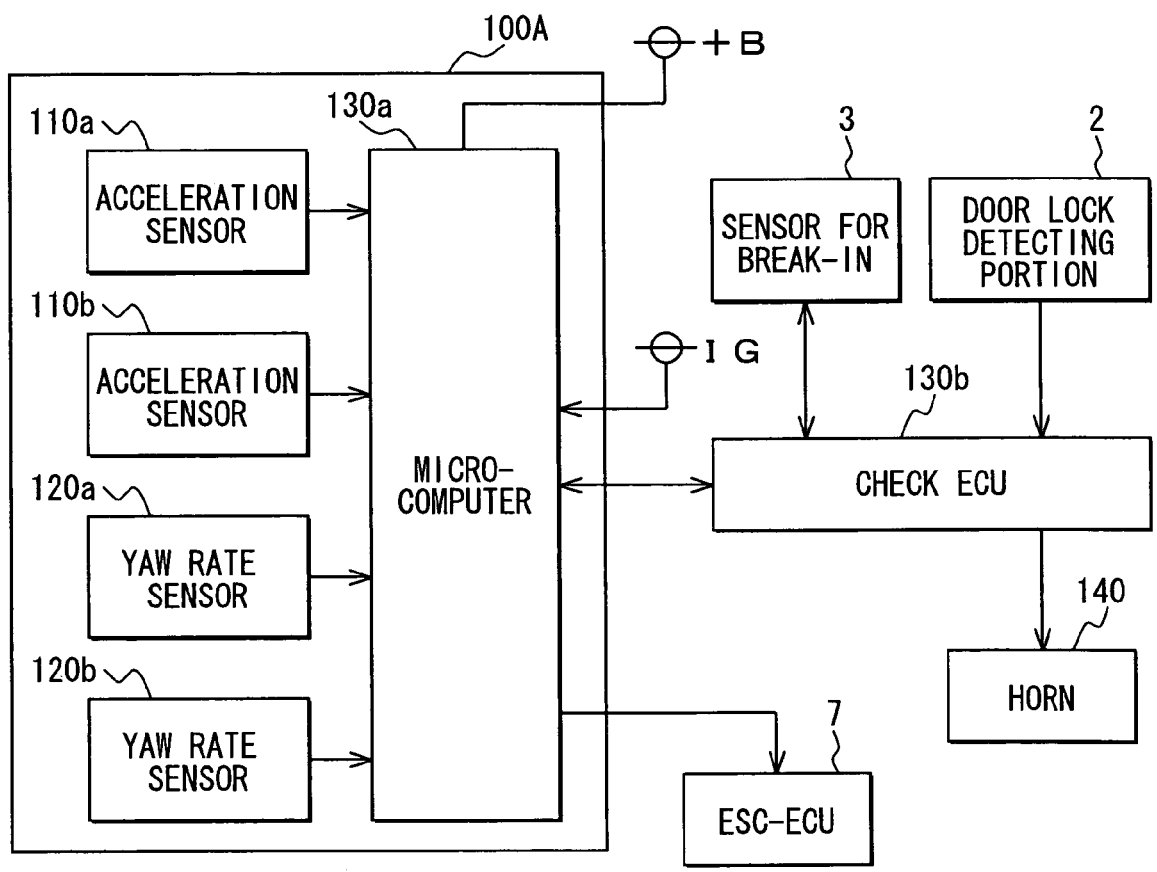
FIG. 1 is a schematic block diagram showing an automotive antitheft system having an inclination sensor, according to a first embodiment of the present invention.

As shown in FIG. 1, an automotive antitheft system has an inclination sensor device 100A, a detecting portion 2 for a door lock device, a sensor 3 for break-in, a check ECU 130b, and a horn 140 as a warning device.

The inclination sensor device 100A is composed of an inertia sensor having multiple acceleration sensors 110a, 110b, multiple yaw-rate sensors 120a, 120b, and a micro-computer 130a. The inertia sensor is also used in an anti-lock braking system for a vehicle. Namely, the inertia sensor is commonly used for the anti-lock braking system and the antitheft system.

The acceleration sensors 110a, 110b detect acceleration in two orthogonal directions in a horizontal plane of a vehicle, for example a longitudinal direction (front-back direction) of the vehicle and a cross direction (right-left direction). The acceleration sensor 110a outputs a detecting signal depending on the acceleration generated in the longitudinal direction, whereas acceleration sensor 110b outputs a detecting signal depending on the acceleration generated in the cross direction. The yaw rate sensors 120a, 120b detect yaw rate of the vehicle to output a detecting signal depending on the yaw rate generated in the vehicle.

The micro-computer 130a comprises well known CPU, ROM, RAM, I/O, and so on, and caries out a process for warning a vehicle theft in accordance with a program stored in the ROM, etc.

More specifically, the micro-computer 130a receives the detecting signals from the acceleration sensors 110a, 110b and the yaw rate sensors 120a, 120b, and converts the analog signals for the acceleration and yaw angle into physical quantities by means of an A/D converter incorporated in the micro-computer. When the micro-computer 130*a* carries out the process for warning the vehicle theft, the micro-computer calculates a change of an inclined angle of the vehicle based on the physical quantity of the acceleration in the longitudinal or cross direction of the vehicle, which is obtained from the detecting signals of the acceleration sensors 110*a*, 110*b*. The micro-computer determines based on the change of the inclined angle of the vehicle whether there is the vehicle theft by the jack-up or the like.

When the anti-lock braking control is performed, the micro-computer 130*a* outputs the physical quantities of the acceleration and the yaw angle to an ESC-ECU 7 through a vehicle local area network (LAN), which is called as CAN.

The ESC-ECU 7 is also a well known computer, which controls braking forces of the vehicle to suppress wheel locks and thereby wheel slips. Namely, the ESC-ECU 7 detects wheel slips of the vehicle based on the acceleration and the yaw angle, and drives electromagnetic valves provided in braking pressure control devices (not shown) as well as motors for operating pumps.

A predetermined voltage is applied to the micro-computer 130*a*, when an ignition switch (IG switch) is turned on. The micro-computer 130*a* detects whether the IG switch is turned on, based on the voltage applied to a terminal of the micro-computer, because whether the predetermined voltage is applied or not is indicated by "Hi (High)" or "Low".

The detecting portion 2 for the door lock device detects whether a vehicle door is locked or not (un-locked), and outputs a door-lock signal corresponding to the condition of the door lock. For example, when the vehicle door is locked by a remote key of a key-less entry system, the locked (or un-locked) door condition is detected by the detecting portion 2 and transmitted to the check ECU 130*b*. For example, when a Body-ECU (not shown) detects the door condition (locked, un-locked) based on a detecting signal and controls a driving signal (lock signal or un-lock signal) to door lock actuators (solenoids), such signals may be used as the door-lock signal from the detecting portion 2.

The break-in sensor 3 is composed of, for example, an infrared sensor, for detecting whether a person breaks in the vehicle. The break-in sensor 3 is provided in the vehicle for detecting a possible vehicle theft, which would be carried out by other method than the jack-up. Other sensors, such as a sensor for detecting breakage of the window glass, may be used.

The check ECU 130*b* determines whether there is the vehicle theft, based on the signals from the inclination sensor 100A, the door-lock detecting portion 2, and the break-in sensor 3. And the check ECU 130*b* operates the horn 140, when it detects the vehicle theft.

More exactly, the check ECU 130*b* receives the door-lock signal from the door-lock detecting portion 2, and outputs a signal (a security-on signal) to the inclination sensor 100A and so on when the door is locked, in order to bring the antitheft system into a standby condition for detecting the possible vehicle theft.

The micro-computer 130*a* provided in the inclination sensor 100A starts its control process, upon receiving the security-on signal, for detecting the vehicle theft based on the output signals from the acceleration sensors 110*a*, 110*b*.

When a signal indicating that there is a possibility of the vehicle theft, or a signal indicating that the person has broken into the vehicle is inputted from the inclination sensor 100A or the break-in sensor 3 into the check ECU 130*b*, the check ECU 130*b* outputs the driving signal to the horn 140.

The horn 140 is operated by the driving signal from the check ECU 130*b* to output a voice (or sound), so that a warning for the possible vehicle theft is carried out.

Figure 2:
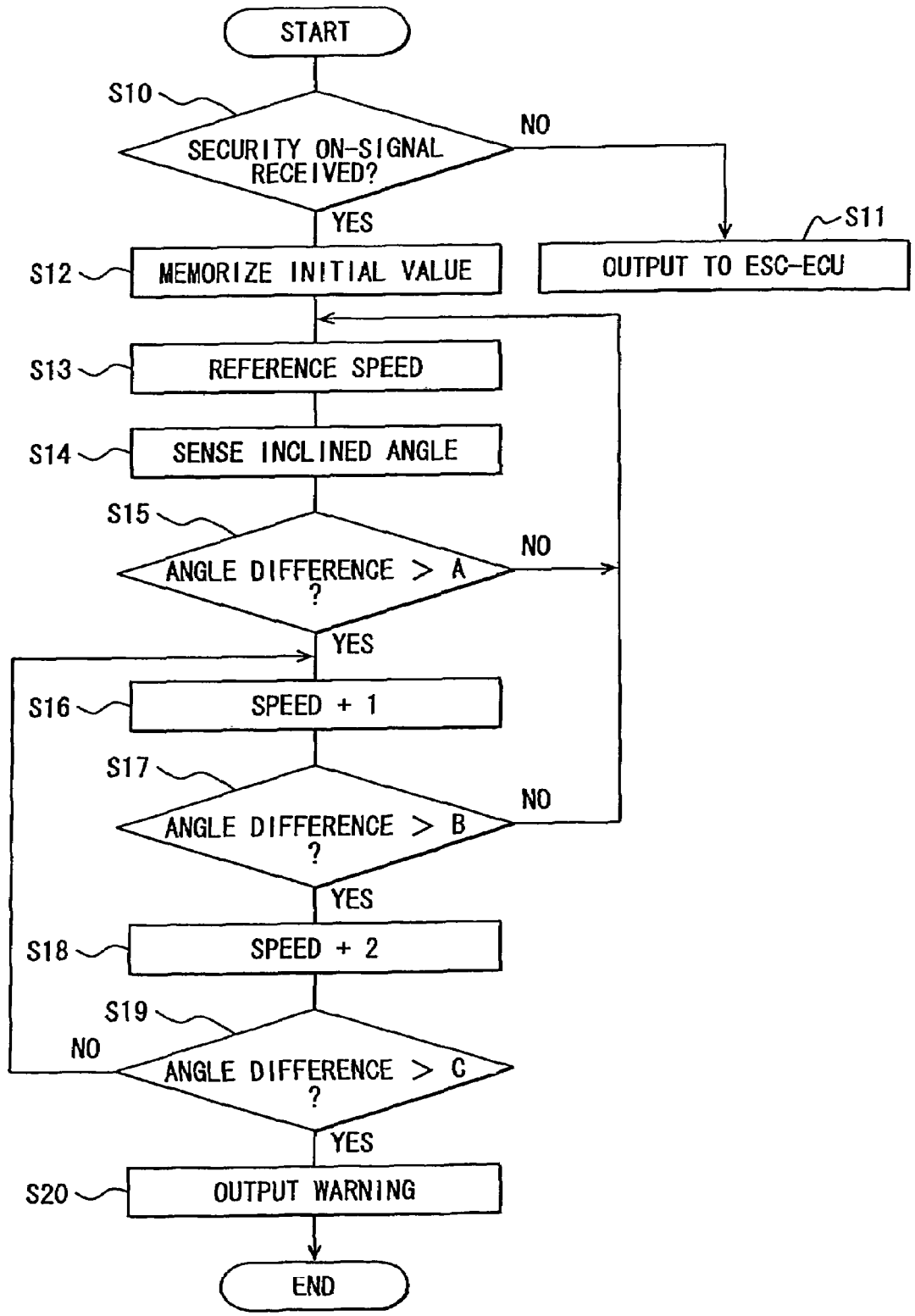
FIG. 2 is a flow chart for performing an antitheft process in the antitheft system of FIG. 1.

A process carried out by the micro-computer 130*a* having the inertia sensor 100A, which is commonly used for the antitheft system and the anti-lock braking system, will be explained. FIG. 2 shows a flow chart for the antitheft process by the micro-computer 130*a*, which is carried out at a predetermined operational period.

At a step S10, the micro-computer 130*a* detects whether it has received the security-on signal from the check ECU 130*b*. When the micro-computer 130*a* receives the security-on signal, the door is in the locked condition and the antitheft system is in the standby condition against the vehicle theft. When the micro-computer 130*a* does not receive the security-on signal, the inclination sensor 100A is not necessary to be brought into the standby condition against the vehicle theft, but in the condition for performing the anti-lock braking control.

Accordingly, in the case of "YES" at the step S10, the process goes to the process for the antitheft control, whereas in the case of "NO", the process goes to a step S11 so that the micro-computer 130*a* outputs to the ESC-ECU 7 the physical quantities of the acceleration and the yaw angle, which have been calculated by the micro-computer 130*a* based on the detecting signals from the acceleration sensors 110*a*, 110*b* and the yaw rate sensors 120*a*, 120*b*.

Figure 3:
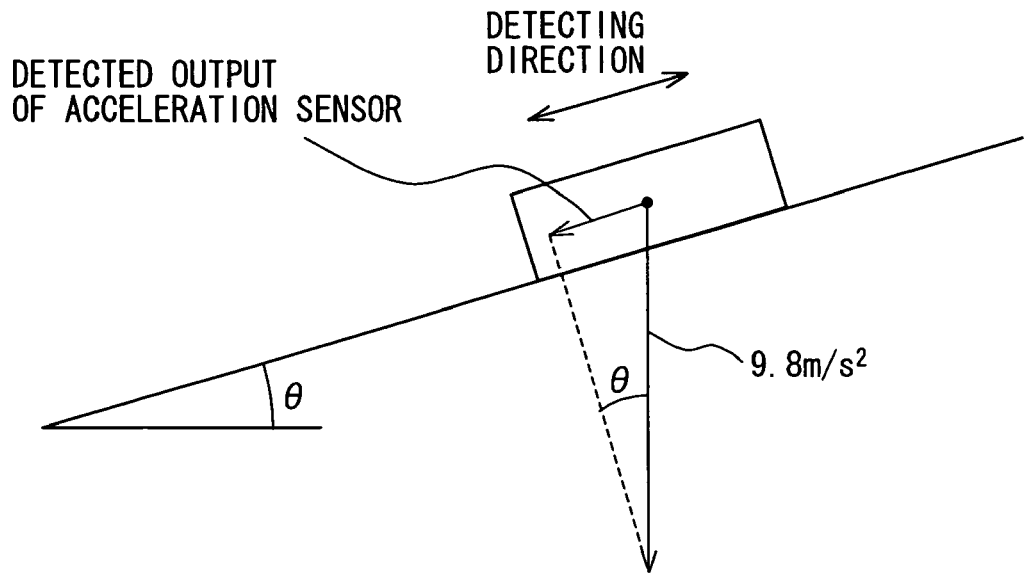
FIG. 3 is an explanation chart for calculating an inclination angle.

At a step S12, the micro-computer 130*a* carries out a process for memorizing an initial value. The initial value here means an inclination angle of the vehicle at a time when the micro-computer 130*a* received the security-on signal. The initial value is calculated from the physical quantities of the acceleration and the yaw angle from the detecting signals from the acceleration sensors 110*a*, 110*b* and the yaw rate sensors 120*a*, 120*b*. FIG. 3 is a schematic diagram showing a calculation method for the inclination angle.

The acceleration sensors 110*a*, 110*b* output the detecting signals, which indicate that the acceleration is zero, when the vehicle is parked on a horizontal place. On the other hand, the acceleration sensors 110*a*, 110*b* output the detecting signals, which includes a component of the gravitational acceleration, when the vehicle is parked on an inclined place with respect to the horizontal plane. For example, in the case that the vehicle is inclined by an inclination angle of $\theta$ in the longitudinal direction, the detecting signal of the acceleration sensor 110*a* becomes a value of 9.8 m/s2 X sin $\theta$. Accordingly, the inclination angle $\theta$ can be obtained by calculating back the output from the acceleration sensor 110*a*.

The inclination direction of the vehicle is not fixed in case of the vehicle theft by the jack-up. Therefore, the pair of acceleration sensors 110*a* and 110*b* are arranged in the vehicle such that the detecting directions of the sensors cross at an angle of 90°, in order to detect the inclined angle of the vehicle. The inclined angle of the vehicle can be calculated in all direction of the horizontal plane, through the vector operation of the detecting signals by the micro-computer 130*a*.

In the case that the two acceleration sensors are arranged in the vehicle such that the detecting directions of the sensors cross at the angle of 90°, one of the sensors may be arranged to detect the gravitational acceleration in the longitudinal direction, whereas the other sensor may be arranged to detect the gravitational acceleration in the cross direction. Furthermore, one of the sensors may be arranged to detect the gravitational acceleration in such a direction, which is displaced from the longitudinal direction by, for example, 30°, 45°, 60°, and so on, whereas the other sensor may be arranged to detect the gravitational acceleration in the direction which crosses at the right angle with the first detection direction.

As above, the initial value (the inclination angle of the vehicle) is memorized at the step S12, when the vehicle is parked. A change of the inclination angle of the vehicle can be obtained by comparing the initial value with the inclination angle, which is calculated for the respective calculation periods (detecting cycles).

At a step S13, the inclination sensor 100A is periodically operated at a reference cycle (a reference speed), which is a rather low frequency. Then, the process goes to a step S14, at which the current inclination angle is detected. The detection of the current inclination angle is carried out by calculating the physical quantities from the current detecting signals from the acceleration signals 110a, 110b.

At a step S15, the micro-computer 130a determines whether a difference between the current inclination angle obtained at the step S14 and the initial value memorized at the step S12 is larger than a first threshold value A. The first threshold value A is decided as such a value, at which the micro-computer 130a takes precautions against the possible vehicle theft.

Namely, in the case that the change of the inclination angle is lower than the first threshold value A, it is not necessary to increase the precaution level. However, when the change of the inclination angle is larger enough to exceed the first threshold value A, it is necessary to detect the possible vehicle theft at a higher precaution level. Accordingly, in case of "NO" at the step S15, the process goes back to the step S13 to repeat the above process at each of the calculation periods. In case of "YES", the process goes to a step S16, at which the detecting cycle is increased to a higher cycle (a first higher speed), by adding "1" to the reference speed. As a result, the determination of the possible vehicle theft is carried out in a shorter period in the following steps.

Then, the process goes to a step S17, at which the micro-computer 130a determines whether the difference between the current inclination angle obtained at the step S14 and the initial value memorized at the step S12 is larger than a second threshold value B. The second threshold value B is larger than the first threshold value A. The second threshold value B corresponds to such a change of the inclination angle of the vehicle, in which the precautions against the possible vehicle theft should be taken at a higher level.

Therefore, in the case of "NO" at the step S17, the process goes back to the step S13, so that the process for the steps S13 to S17 is repeated at the respective calculation periods. In the case of "YES", the process goes to a step S18, at which the detecting cycle is further increased to a much higher cycle (a second higher speed), by adding "2" to the reference speed. As a result, the determination of the possible vehicle theft is carried out in a much shorter period in the following steps.

It is necessary to reduce energy consumption of a battery energy, because the operation of the inclination sensor 100A is carried out by the power supply from the battery during the vehicle is parked. According to the above process (the steps S13, S16, S18), the inclination sensor 100A is periodically operated such that the detecting cycle is decreased depending on the precaution level against the possible vehicle theft. As a result, the energy consumption of the battery can be reduced, while the possible vehicle theft can be properly detected.

When the process goes to a step S19, the micro-computer 130a determines whether the difference between the current inclination angle obtained at the step S14 and the initial value memorized at the step S12 is larger than a third threshold value C. The third threshold value C is larger than the second threshold value B. The third threshold value C corresponds to such a change of the inclination angle of the vehicle, in which the micro-computer should determine that the possible vehicle theft has occurred.

In the case of "NO" at the step S19, the process goes back to the step S16. On the other hand, in the case of "YES" at the step S19, the process goes further to a step S20 for carrying out a warning. The micro-computer 130a outputs a warning signal, which indicates that there is a high possibility of the vehicle theft, to the check ECU 130b. The check ECU 130b outputs the driving signal for the horn 140. As a result, the possible vehicle theft can be suppressed by warning sound by the horn 140.

Although not shown here, the detecting cycle is returned to its reference speed when the determination result at the step S15 is "NO", after the detecting cycle has been increased at the step S16 or S18. Accordingly, even when the detecting cycle is increased once at the step S16 or S18, the detecting cycle is returned to the reference speed in the case that the change of the inclination angle becomes lower than the first threshold value A.

As above, the inertia sensor 100A is commonly used for the anti-lock braking system and the antitheft system. As a result, it is possible to suppress the increase of the business investment and to provide the automotive antitheft system which requires the smaller space for mounting the antitheft system.

In the above embodiment, the detecting signals for the acceleration and the angular velocity are outputted to the ESC-ECU 7, when the IG switch is turned on, whereas the signal for indicating the possible theft of the vehicle is outputted to the check ECU 130b during the IG switch is turned off. However, the signal for indicating the possible theft of the vehicle may be outputted to the check ECU 130b even during the IG switch is turned on.

Second Embodiment

A second embodiment of the present invention will be explained with reference to the accompanying drawings (FIGS. 4 to 9). In the drawings, letters F, B, L and R respectively designate a front, a back, a left, and a right direction.

(Structure of Inclination Sensor)

Figure 4:
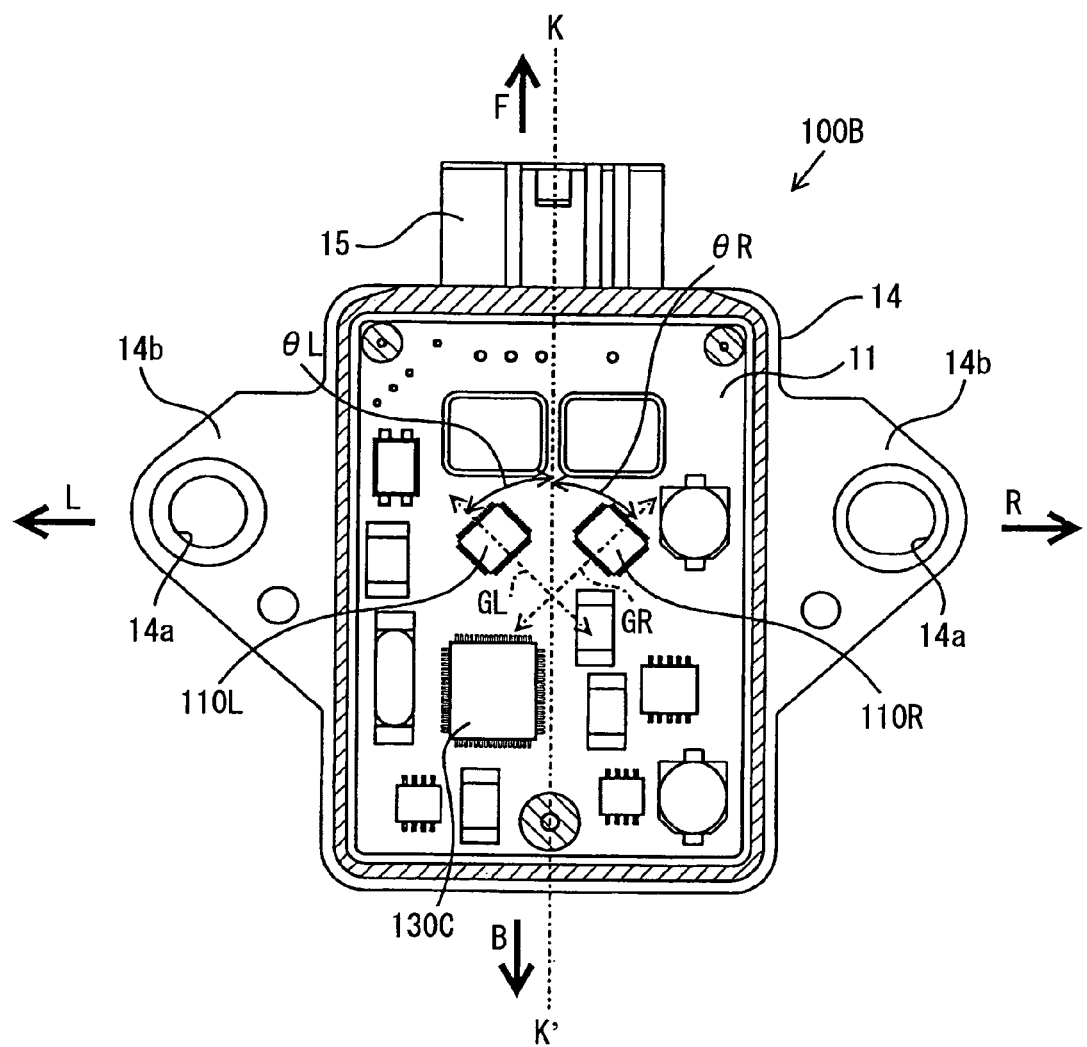
FIG. 4 is a schematic view showing an inclination sensor, according to a second embodiment of the present invention.

As shown in FIG. 4, an inclination sensor 100B is composed of detecting elements 110R, 110L, a micro-computer 130c, a printed circuit board 11 on which electrical parts and components are mounted, and a module casing 14 for accommodating the printed circuit board 11. In FIG. 4, the module casing having a box shape is shown, in which a top portion is removed.

Each of the detecting elements 110R, 110L is made of such a sensor element for detecting an inclination in a certain direction. For example, the detecting element 110R, 110L has a detecting portion (not shown) of an electrostatic capacitor type, which is formed as a beamed structure in a semiconductor substrate having multiple fixed and movable electrodes, wherein the fixed and movable electrodes are arranged to oppose to each other in a comb-shape. According to such a structure, when acceleration is applied to the detecting element in a certain direction, the movable electrodes are displaced toward a direction, in which the acceleration is applied, so that a gap between the fixed and movable electrodes is changed. A change of the electrostatic capacity is processed by a signal generating circuit (not shown) and a demodulating circuit (not shown), both of which are controlled by the micro-computer 130c, and finally outputted as a detecting signal depending on the electrostatic capacity.

The detecting elements 110R, 110L can detect the acceleration applied thereto in the certain direction. Therefore, the detecting element 110L is mounted on the board 11, such that the detection direction thereof is arranged in a direction, which crosses with a center line K-K' of a vehicle 30 at an angle of θL. The detecting element 110R is likewise mounted on the board 11 in a symmetric manner to the detecting element 110L with respect to the center line K-K'. Namely, the detection direction of the detecting element 110R is arranged in a direction, which crosses with the center line K-K' of the vehicle 30 at an angle of θR. According to the embodiment, the angles θL and θR are selected as to be 45°.

According to such an arrangement, the inclination of the vehicle 30 in the longitudinal (F-B) direction, which occurs at starting or braking the vehicle or which may occur at a vehicle theft by the tow truck, as well as the inclination of the vehicle 30 in the cross (L-R) direction, which occurs at turning the vehicle, can be always detected by two detecting elements 110L and 110R.

Figure 5:
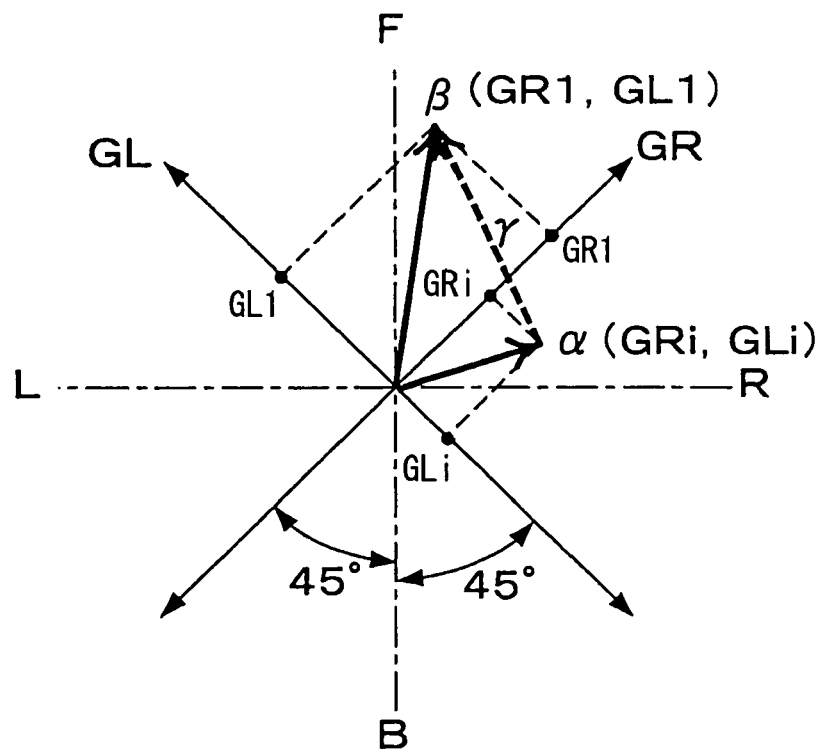
FIG. 5 is an explanatory chart for calculating an inclined angle of a vehicle according to the second embodiment of the present invention.

A calculation method of the inclined angle of the vehicle will be explained with reference to FIG. 5. In FIG. 5, a plane, which is defined by the longitudinal (F-B) direction and the cross (L-R) direction, is shown. Furthermore, the detection directions GL and GR of the detecting elements 110L and 110R are indicated. The detection directions GL and GR cross with the longitudinal (F-B) and cross (L-R) directions at the angle of 45°.

The acceleration generated at the vehicle 30 can be indicated by a vector in the plane defined by the lines F-B and L-R. In FIG. 5, a vector a designates the acceleration caused by the inclination of the vehicle 30, which is detected by the detecting elements 110L, 110R for the first time when the vehicle 30 is parked (when an ignition switch is turned off). A vector β designates the acceleration caused by the inclination of the vehicle 30, which is detected by the detecting elements 110L, 110R after a predetermined time period since the vehicle 30 is parked. A vector γ designates a change of the acceleration corresponding to a difference between the above vectors α and β.

The vector α can be divided into an orthogonal projection component GRi to the detection direction GR of the detecting element 110R and an orthogonal projection component GLi to the detection direction GL of the detecting element 110L. The vector a can be indicated by a position vector (GRi, GLi). The orthogonal projection component GRi is detected by the detecting element 110R, and outputted to the micro-computer 130c as an acceleration signal GRi. In the same manner, the orthogonal projection component GLi is detected by the detecting element 110L, and outputted to the micro-computer 130c as an acceleration signal GLi.

The vector β can be divided into an orthogonal projection component GR1 to the detection direction GR of the detecting element 110R and an orthogonal projection component GL1 to the detection direction GL of the detecting element 110L. The vector β can be indicated by a position vector (GR1, GL1). The orthogonal projection component GR1 is detected by the detecting element 110R, and outputted to the micro-computer 130c as an acceleration signal GR1. In the same manner, the orthogonal projection component GL1 is detected by the detecting element 110L, and outputted to the micro-computer 130c as an acceleration signal GL1.

Figure 6:
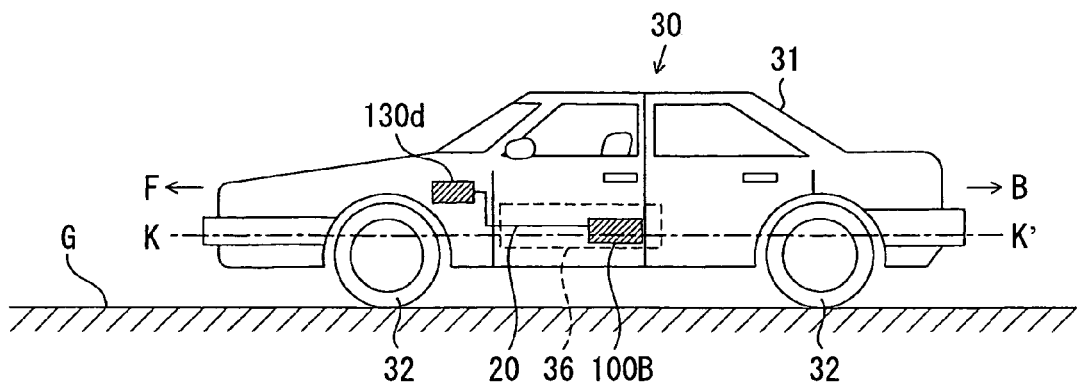
FIG. 6 is a schematic side view showing a position of the inclination sensor mounted in a vehicle.

The vector γ is the difference between the vector α and the vector β. The vector γ can be indicated by a position vector (GR1−GRi, GL1−GLi), which is a difference value of the orthogonal projection components. The vector γ is the horizontal component of the gravitational acceleration, in the case that the vehicle 30 is inclined with respect to the ground (horizontal) plane G (FIG. 6). Therefore, the inclined angle of the vehicle can be calculated based on the difference values GR1−GRi and GL1−GLi.

As above, the detection accuracy for the inclined angle of the vehicle 30 can be improved, because the vectors α and β indicating accelerations caused by the inclination of the vehicle 30 can be always detected by two detecting elements 110R and 110L.

Furthermore, the detection directions GR and GL of the detecting elements 110R and 110L are displaced by the same angle (45°) with respect to the longitudinal (F-B) and cross (L-R) directions of the vehicle 30, wherein the inclination of the vehicle occurs in such longitudinal (F-B) and cross (L-R) directions in most cases. Accordingly, almost identical detection accuracies can be achieved in both of the longitudinal (F-B) and cross (L-R) directions of the vehicle 30.

An angle formed between the vector α and one of the detection directions GL and GR of the detecting elements 110L and 110R always becomes less than 45°. This is also applied to the vector β. This means that a detecting angular range of one detecting element is from 0° to 45°. Accordingly, the detection accuracy does not largely change depending on the direction of the vehicle inclination, and the detection accuracy for the inclined angle of the vehicle 30 is thereby improved.

Furthermore, the detection directions of the detecting elements 110L and 110R are arranged in a reference plane of a vehicle body 31. In other words, the detection directions are arranged to be in parallel to the ground plane G, when the vehicle 30 is parked. This means that the detection directions are arranged on such a plane, on which the change of the accelerations caused by the vehicle inclination appears most largely. The detection accuracy for the inclined angle of the vehicle 30 is also improved in this meaning.

The micro-computer 130c is a so-called one-chip micro-computer having memory devices, such as, ROM, RAM, etc. and an interface device, and so on, as shown in FIG. 4. The micro-computer 130c carries out a process for obtaining an inclination signal based on the detecting signals from the detecting elements 110L and 110R, and outputs the inclination signal θ of the vehicle 30 to ECU 130d (FIG. 6).

As shown in FIGS. 4 and 6, the module casing 14 is a resin-molded casing formed into the rectangular box shape. A pair of attaching portions 14b is provided at longitudinal ends of the module casing 14. An attaching hole 14a is formed in the respective attaching portions 14b, with which the module casing 14 (i.e. the inclination sensor 100B) is attached to an inside of a center console 36 of the vehicle.

A tube-shaped connector 15 is provided at one crosswise end of the module casing 14. Multiple connector pins (not shown) are provided in the connector 15. The detecting elements 110L, 110R, the micro-computer 130c and other electrical components, which are mounted on the printed circuit board 11, are electrically connected to the ECU 130d provided at the outside of the module casing 14 through the connector pins. As shown in FIG. 6, the inclination sensor 100B is connected to the ECU 130d through CAN (Control Area Network) 20.

(Position of the Inclination Sensor)

Figure 7:
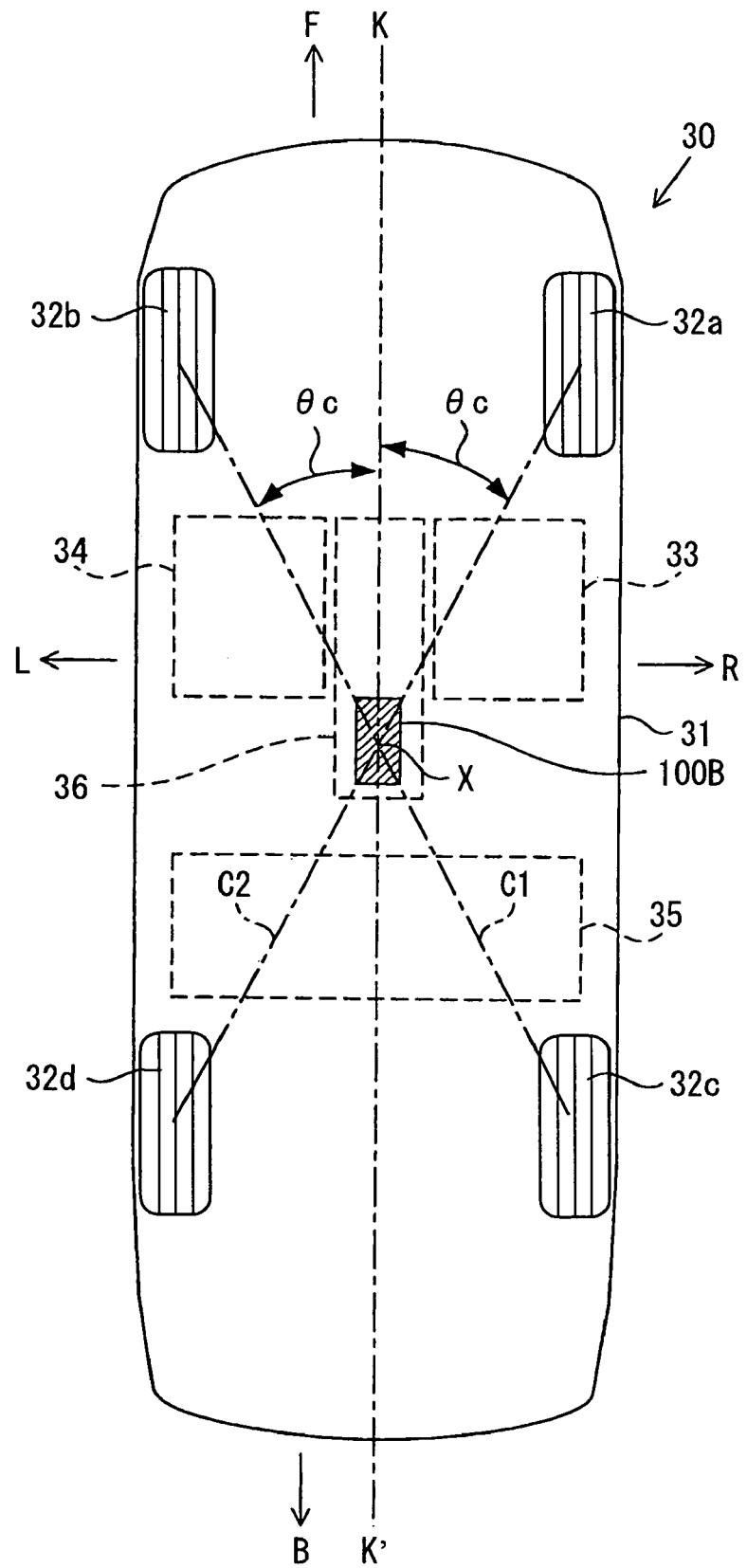
FIG. 7 is a schematic top view showing the position of the inclination sensor mounted in the vehicle.
Figure 9:
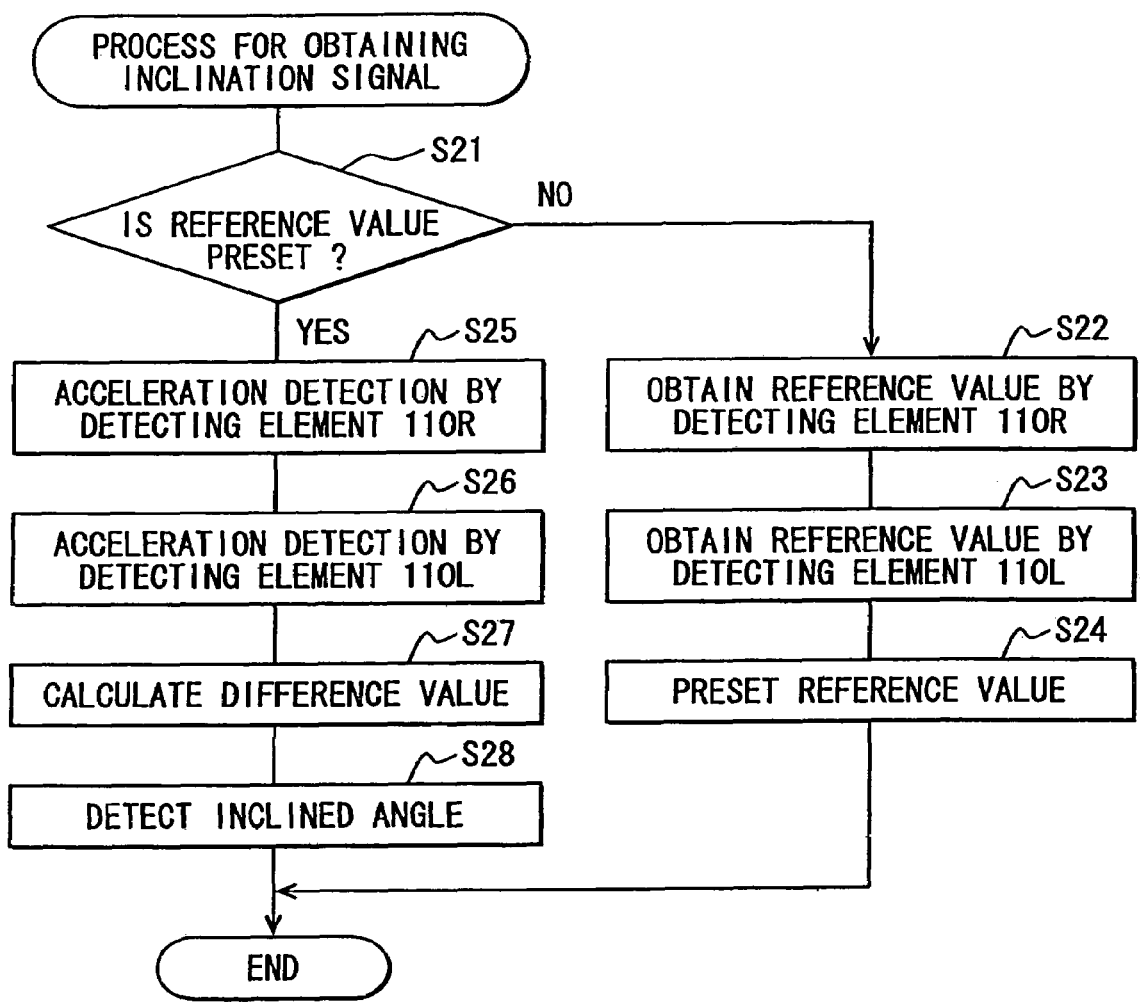
FIG. 9 is a flow chart for performing a process for obtaining an inclination signal.

As shown in FIG. 6, the inclination sensor 100B is mounted in the inside of the center console 36 of the vehicle 30, such that the it is arranged in parallel to the ground plane G, at which the vehicle body 31 is positioned. Furthermore, as shown in FIG. 7, the inclination sensor 100B is positioned in the center console 36 provided between a front right seat 33 and a front left seat 34, and at a side of a rear seat 35.

This position further corresponds to an intersecting point X, at which a diagonal line C1 connecting a front left wheel 32b with a rear right wheel 32c and another diagonal line C2 connecting a front right wheel 32a with a rear left wheel 32d intersect with each other. Therefore, distances between the inclination sensor 100B and the respective wheels 32a to 32d are equal among each other. As a result, the inclination sensor 100B detects in a balanced manner the inclination of the vehicle 30 in the longitudinal (F-B) and cross (L-R) directions. Accordingly, the detection accuracy does not largely change depending on the direction of the vehicle inclination, and the detection accuracy for the inclined angle of the vehicle 30 is thereby improved.

The diagonal lines C1 and C2 respectively intersect with the center line K-K' of the vehicle 30 at an angle of θc. In case of a wheel base having 2,600 mm and a wheel track having 1,490 mm, the angle θc becomes about 30°. Therefore, when the angles θR and θL are made to be about 30°, the inclination sensor can detect the inclination in the direction, in which the change of the vehicle inclination appears most largely at steering the wheels. The detection accuracy for the inclined angle of the vehicle 30 is also improved in this meaning.

(Process for Antitheft Determination)

An example, in which the inclination sensor 100B is applied to the antitheft apparatus, will be explained. In the antitheft apparatus, an abnormal inclination of the vehicle 30 during parking of the vehicle is detected by the inclination sensor 100B, wherein the abnormal vehicle inclination occurs when the front wheels are lifted by a tow truck. When the antitheft apparatus detects a possible vehicle theft, it raises an alarm, for example, by a horn. The antitheft apparatus is composed of the inclination sensor 100B, the ECU 130d, the horn (not shown), and so on.

Figure 8:
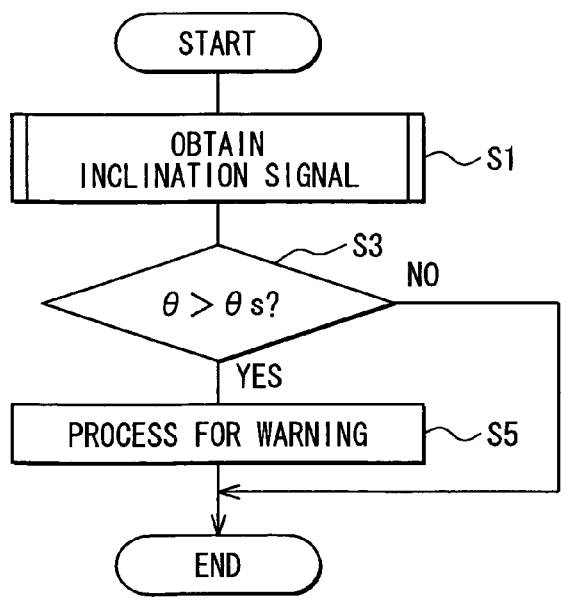
FIG. 8 is a flow chart for performing an antitheft process using the inclination sensor of the present invention.

A process for determining the possible vehicle theft will be explained with reference to FIG. 8. This process is performed by the ECU 130d shown in FIG. 6, and carried out at predetermined intervals after an ignition switch for the vehicle 30 is turned off.

At a step S1, the ECU 130d receives the inclination signal θ for the inclination of the vehicle 30 from the inclination sensor 100B.

At a step S3, the ECU 130d determines whether the inclination signal θ obtained at the step S1 is larger than a predetermined value θs.

In case of "YES" at the step S3, namely when the ECU 130d determines that the inclination signal θ is larger than the predetermined value θs, the ECU 130d determines the vehicle theft, because the vehicle is inclined in the longitudinal or cross direction at such an angle, which is out of a normal angle. Then ECU 130d raises the alarm at a step S5.

In case of "NO" at the step S3, namely when the inclination signal θ is not larger than the predetermined value θs, the ECU 130d determines that the vehicle 30 is not stolen. Then, the process ends, without raising any alarm.

(Process for Obtaining the Inclination Signal)

As explained above, the ECU 130d receives the inclination signal at the step S1. The inclination signal is obtained from the micro-computer 130c. A process for obtaining the inclination signal is explained with reference to FIG. 9.

At a step S21, the micro-computer 130c determines whether a reference value is preset or not. Namely, the micro-computer 130c determines whether the first acceleration signals GRi and GLi from the detecting elements 110R and 110L are preset as the reference values, after the vehicle 30 is parked (the ignition switch is turned off). The reference values have been cleared up when the ignition switch is turned off.

In case of "NO" at the step S21, namely when the acceleration signals GRi and GLi are not preset as the reference values, the process goes to a step S22 and a step S23. At the steps S22 and S23, the micro-computer 130c detects the acceleration signals GRi and GLi inputted from the detecting elements 110R and 110L.

At a step S24, the micro-computer 130c presets the acceleration signals GRi and GLi as the reference values GRi and GLi. Then, the process ends after the step S24, and holds it until the next process.

In case of "YES" at the step S21, namely when the acceleration signals GRi and GLi are preset as the reference values, the process goes to steps S25 and S26. At the steps S25 and S26, the micro-computer 130c detects the current acceleration signals GR1 and Gl1 from the detecting elements 110R and 110L.

At a step S27 the micro-computer 130c calculates the difference values between the current acceleration signals GR1 and Gl1 with the reference values GRi and Gli, to obtain the values "GR1−GRi" and "GL1−GLi".

At a step S28, the micro-computer 130c calculates the acceleration signal θ based on the difference values "GR1−GRi" and "GL1−GLi" in accordance with a well known algorithm, and the process goes to end.

The order of the steps S22 and S23, as well as the steps S25 and S26, may be respectively counterchanged.

Advantages of the Embodiment (1) As explained above, according to the above embodiment, the inclination sensor 100B mounted in the vehicle has the detecting elements 110L and 110R having the specific detection directions, and detects the inclination of the vehicle 30 based on the detecting signals (GLi, GL1, GRi, GR1), wherein the detecting elements 110R and 110L are mounted on the printed circuit board 11 such that the detection directions are arranged to be displaced from the center line K-K' of the vehicle by the angle of 45°.

According to the above arrangement, the inclination of the vehicle 30 in the longitudinal (F-B) direction, which occurs at starting or braking the vehicle or which may occur at the possible vehicle theft by the tow truck, as well as the inclination of the vehicle 30 in the cross (L-R) direction, which occurs at turning the vehicle, can be always detected by two detecting elements 110L and 110R. As a result, the detection accuracy for the inclined angle of the vehicle can be improved, when compared with an inclination sensor having two detecting elements, which respectively detect the inclination in the longitudinal and cross directions of the vehicle.

(2) The detection directions of the detecting elements 110L and 110R are arranged at the same angles with respect to the longitudinal and cross directions of the vehicle 30, in which the vehicle inclination occurs most frequently. Accordingly, almost identical detection accuracies can be achieved in both of the longitudinal (F-B) and cross (L-R) directions of the vehicle 30.

The angle between the inclination direction of the vehicle 30 and at least one of the detection directions of the detecting elements 110L and 110R becomes less than 45°. Accordingly, the detection accuracy does not largely change depending on the direction of the vehicle inclination, and the detection accuracy for the inclined angle of the vehicle 30 is thereby improved.

(3) Furthermore, the detection directions of the detecting elements 110L and 110R are arranged in the reference plane of the vehicle body 31, namely in parallel to the ground plane G, when the vehicle 30 is parked. In other words, the specific detection directions of the detecting elements 110L and 110R are arranged to be in parallel to the reference plane of the vehicle body. This means that the detection directions are arranged on such a plane, on which the change of the accelerations caused by the vehicle inclination appears most largely. As a result, the detection accuracy for the inclined angle of the vehicle 30 is further improved.

(4) The inclination sensor 100B is located at a vicinity of the intersecting point X, at which the diagonal line C1 connecting the front left wheel 32b with the rear right wheel 32c and the other diagonal line C2 connecting the front right wheel 32a with the rear left wheel 32d intersect with each other. Therefore, the distances between the inclination sensor 100B and the respective wheels 32a to 32d become equal with each other. As a result, the inclination sensor 100B detects in a balanced manner the inclination of the vehicle 30 in the longitudinal (F-B) and cross (L-R) directions. Furthermore, since the detection accuracy does not largely change depending on the direction of the vehicle inclination, the detection accuracy for the inclined angle of the vehicle 30 is thereby improved.

(5) The inclination signal θ is calculated based on the difference values GR1−GRi and GL1−GLi, which are obtained from the current acceleration signals GR1 and GL1 and the reference values GRi and GLi. Since the change of the vehicle orientation between the current orientation and the orientation at the parking can be detected as the change of the accelerations, the detection accuracy is further improved.

(Modifications)

(1) The inclination sensor 100B of the present invention can be also used to a vehicle stability control system (VSC), and so on, in which the vehicle inclination is detected.

In such a case, the inclination sensor 100B is connected to a control ECU for VSC through the CAN 20, so that the inclination signal θ is periodically transmitted to the control ECU. As a result, data for the vehicle inclination can be given to the vehicle stability control system as a data necessary for the control of the vehicle orientation. The reference values are likewise cleared up each time when the ignition switch is turned off.

(2) Another type of detecting element, such as a piezoelectric type sensor, can be used in place of the electrostatic capacitor type detecting elements 110L, 110R. Furthermore, the detecting elements 110L, 110R may be formed in a single semi-conductor package, so that the inclination sensor can be made smaller in size.

Third Embodiment

Figure 10:
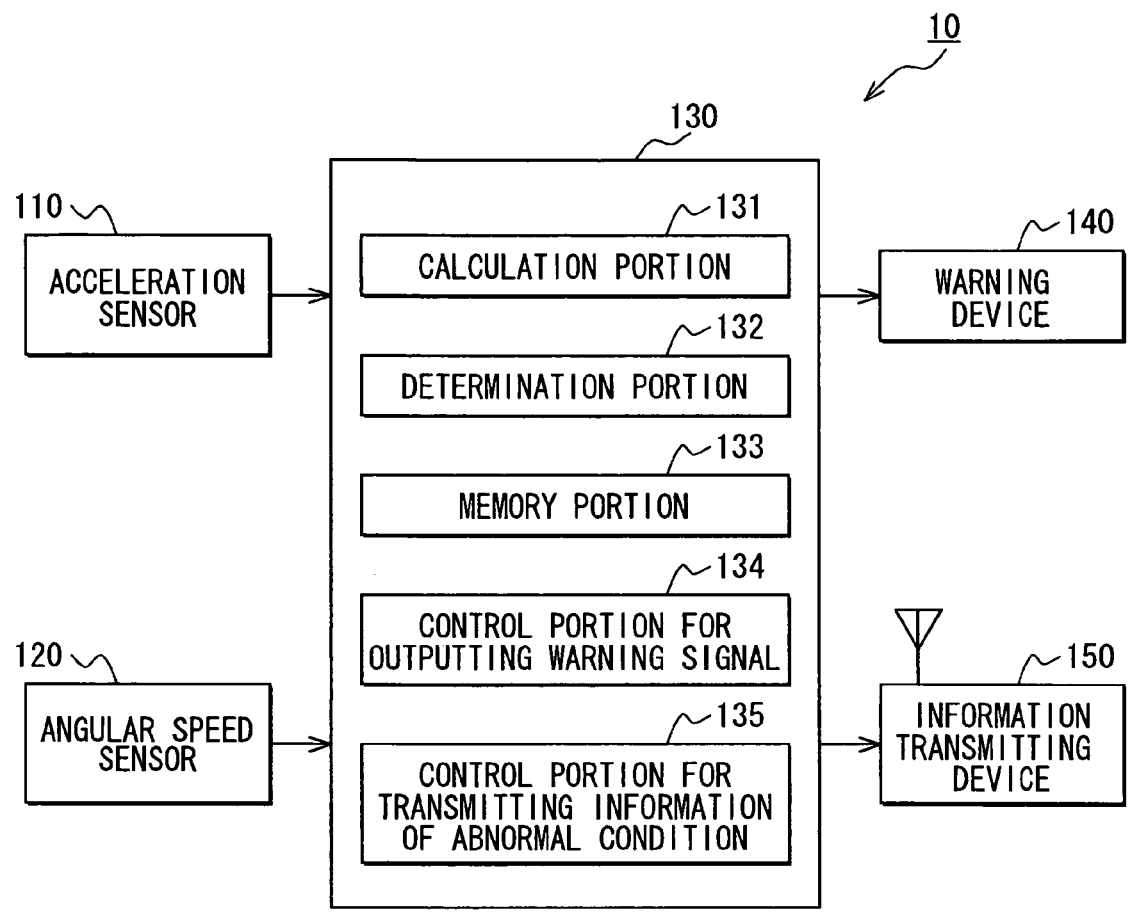
FIG. 10 is a schematic block diagram showing an antitheft apparatus for a vehicle, according to a third embodiment of the present invention.

FIG. 10 is a schematic block diagram showing an antitheft apparatus 10 for a vehicle, according to a third embodiment of the present invention.

As shown in FIG. 10, the antitheft apparatus 10 is composed of an acceleration sensor 110, an angular speed sensor 120, an electronic control unit (ECU) 130, a warning device 140, and an information transmitting device 140.

The acceleration sensor 110 detects an acceleration of the vehicle and outputs a signal depending on the acceleration. A detecting principle, a number of detecting axis, and a number of sensors are not limited to specific values. For example, a sensor of a piezoelectric type, an electrostatic capacitance type, an electromagnetic type, a gas (thermo-type) type, and so on can be used in the invention. According to the embodiment, the acceleration sensor 110 is formed as to detect accelerations in two directions, namely in an X axis, which is a cross direction (left-right direction) of the vehicle, and in a Y axis, which is a longitudinal direction (front-back direction) of the vehicle in the horizontal plane.

The angular speed sensor 120 detects an angular speed of the vehicle and outputs a signal depending on the detected angular speed. A detecting principle, a number of detecting axis, and a number of sensors are not limited to specific values, either. For example, a sensor of an oscillation type, a gas type, an electromagnetic type, an optical type, and so on can be used in the invention. According to the embodiment, the angular speed sensor 120 is formed as to detect the angular speed around a yaw axis, which is vertical to the horizontal plane. Namely, the angular speed sensor 120 is formed as a yaw rate sensor.

The acceleration sensor 110 as well as the angular speed sensor 120 are used not only in a system for a VDIM (Vehicle Dynamics Integrated Management) system but also for the antitheft apparatus of the present invention. Namely, those sensors 110 and 120 are commonly used for the multiple systems (the VDIM system and the antitheft apparatus), so that the number of sensors to be mounted in the vehicle is reduced. The acceleration sensor 110 and the angular speed sensor 120 are mounted in a common printed circuit board and accommodated in a common housing. As a result, the antitheft apparatus 10 is made smaller in its size. The acceleration sensor 110 and the angular speed sensor 120 may be formed by different semiconductor chips and mounted on the same printed circuit board, or those sensors are formed in the same semiconductor chip.

The ECU 130 is formed as a well known computer having CPU, ROM, RAM, I/O, and a bus line connecting them with each other. A program is memorized in ROM, which is carried out by the ECU 130, so that predetermined calculations are performed by CPU according to the program. The ECU 130 has a calculation portion 131, a determination portion 132, a memory portion 133, a control portion 134 for outputting a warning signal, and a control portion 135 for outputting a signal of an abnormal condition.

The calculation portion 131 periodically reads in signals from the acceleration sensor 110 and the angular speed sensor 120, to respectively calculate date relating to the vehicle accelerations in the horizontal plane and data relating to the angular speed around the yaw axis.

The determination portion 132 determines whether the vehicle is in the parking condition or the vehicle is in the theft condition, namely, whether the vehicle is in the normal or abnormal condition, based on the calculation results at the calculation portion 131.

The memory portion 133 memorizes the data to be used for the calculation, the calculation results, comparison data used for determination, and so on.

The control portion 134 operates the warning device 140, when the ECU 130 (the determination portion 132) determines that the vehicle is in the theft condition (the abnormal condition), so that the abnormal condition is informed to persons outside of the vehicle. According to the embodiment, the warning device 140 is formed by a horn for emitting a warning sound. The warning device 140 is not limited to the horn, but any other means may be used as the warning device. For example, the abnormal condition may be informed by turning on and off any lights of the vehicle.

The control portion 135 operates the information transmitting device 150, when the ECU 130 (the determination portion 132) determines that the vehicle is in the theft condition (the abnormal condition), so that the abnormal condition is transmitted to a terminal (e.g. a user terminal of a cellular phone, a terminal of a security company).

Figure 11:
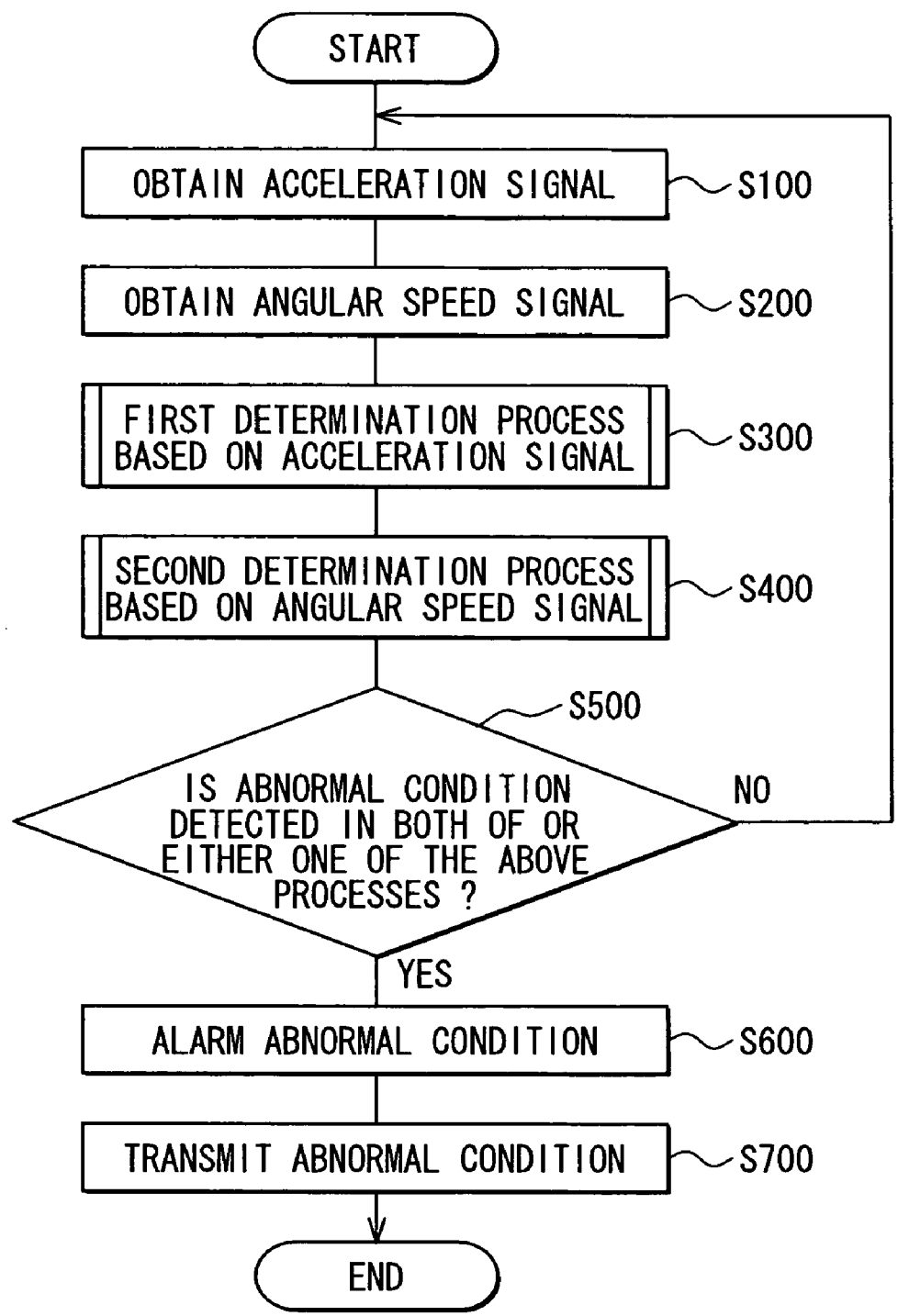
FIG. 11 is a flow chart showing a major process for a control performed by ECU in the third embodiment.

An example for detecting the abnormal condition by the antitheft apparatus will be explained with reference to flow charts of FIGS. 11 to 15. FIG. 11 is a flow chart showing a major process portion of the operation performed by the ECU 130.

When an ignition switch is turned off by an operation of an ignition key cylinder or a push-button switch, an operational mode of the ECU 130 is turned to a security mode. Then, the calculation portion 131 reads in the acceleration signal from the acceleration sensor 110 at a step S100, and reads in the angular speed signal from the angular speed sensor 120 at a step S200.

Then, at a step S300, the calculation portions 131 and the determination portion 132 carry out a first determination process based on the acceleration signal. And at a step S400, the calculation portions 131 and the determination portion 132 carry out a second determination process based on the angular speed signal.

At a step S500, after the steps S300 and S400, the determination portion 132 determines whether the abnormal condition (the possible vehicle theft) is determined in either one of, or in both of, the steps S300 and S400.

In the case that the abnormal condition is determined in either one of, or in both of, the steps S300 and S400, the warning device 140 is operated by the control portion 134 of the ECU 130. The possible vehicle theft is thereby informed to persons outside of the vehicle, at a step S600. The control portion 135 is also operated at a step S700, so that the possible vehicle theft is transmitted to the terminal.

In the case that the abnormal condition is determined in neither one of the steps S300 and S400, the process goes back to the step S100, to repeat the process for determining the possible vehicle theft. The process of FIG. 11 is repeated at a predetermined cycle, and the process will be ended when the ignition switch is turned on.

Figure 12:
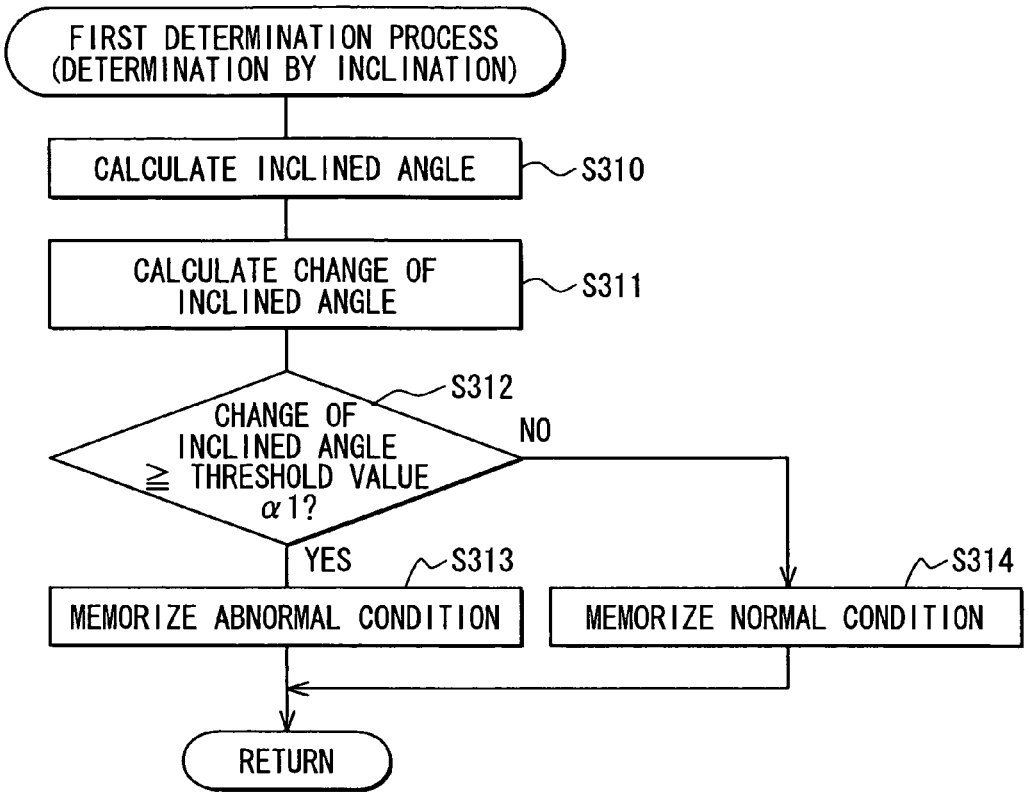
FIG. 12 is a flow chart showing an example of a first determining process, according to which a possible vehicle theft is determined based on a change of a vehicle inclination.

More detailed processes for the first determination process at the step S300 and the second determination process at the step S400 will be explained below. FIG. 12 is a flow chart showing an example of the first determination process, according to which an inclination is determined.

The acceleration signal includes a gravitational acceleration component. The calculation portion 131 calculates a current inclined angle of the vehicle based on the acceleration signal, at a step S310.

At a step S311, the calculation portion 131 calculates a change of the inclined angle between the current inclined angle obtained at the step S310 and a reference inclined angle, which is in advance calculated by the calculation portion 131 and memorized in the memory portion 133. The reference inclined angle is obtained, for example, by calculating an average amount of the inclined angles, which the calculation portion 131 receives for a predetermined period (e.g. 10 seconds) after receiving the first acceleration signal, when the ignition switch is turned off (the security mode is turned on). The reference inclined angle may be obtained by calculating an average amount of the inclined angles for another predetermined period. Furthermore, the inclined angle calculated at the step S310 in the previous determination cycle may be used as the reference inclined angle. In any cases, the inclined angle of the vehicle, which is in the parking condition, may be preferably used as the reference inclined angle.

At a step S312, the determination portion 132 compares the calculated change of the inclined angle with a predetermined threshold value $\alpha 1$, and determines whether the change of the inclined angle is larger than the threshold value $\alpha 1$. When the change of the inclined angle is larger than the threshold value $\alpha 1$, namely YES at the step S312, the determination portion 132 determines that it is in the abnormal condition, which is memorized in the memory portion 133 at a step S313. On the other hand, when the change of the inclined angle is smaller than the threshold value $\alpha 1$, namely NO at the step S312, the determination portion 132 determines that it is in the normal condition, which is memorized in the memory portion 133 at a step S314. At the step S500 of FIG. 11, the ECU 130 determines whether the vehicle is in the normal parking condition or in the possible theft condition based on the information memorized in the memory portion 133. The threshold value $\alpha 1$ is decided in consideration of noises.

Figure 13:
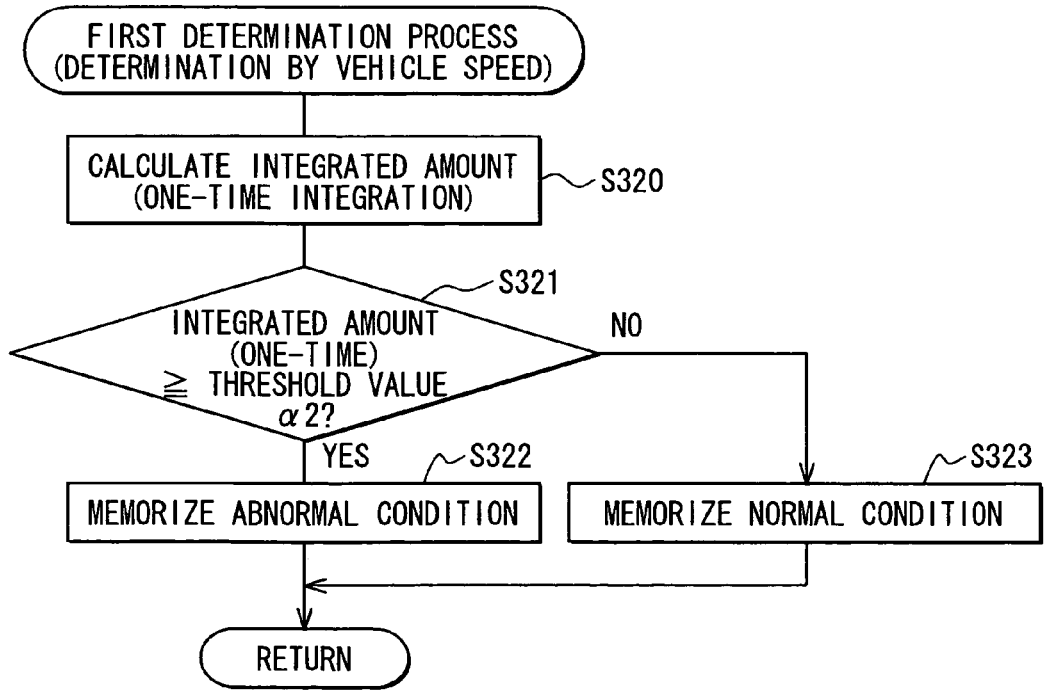
FIG. 13 is a flow chart showing an example of the first determining process, according to which a possible vehicle theft is determined based on a vehicle speed.

FIG. 13 is a flow chart showing an example of the first determination process, according to which the possible vehicle theft is determined by calculating a vehicle speed. At a step S320, the calculation portion 131 calculates a current vehicle speed by performing the integration of the acceleration by one time.

At a step S321, the determination portion 132 compares the calculated vehicle speed (the integrated value by one time) with a predetermined threshold value $\alpha 2$, and determines whether the integrated value by one time is larger than the threshold value $\alpha 2$. And in the similar manner to FIG. 12, the abnormal condition (the integrated value is larger than $\alpha 2$) or the normal condition (the integrated value is smaller than $\alpha 2$) is respectively memorized in the memory portion 133, at a step S322 or S323. And also like the above process of FIG. 12, the ECU 130 determines whether the vehicle is in the normal parking condition or in the possible theft condition based on the information memorized in the memory portion 133, at the step S500 of FIG. 11. The threshold value $\alpha 2$ is likewise decided in consideration of noises.

Figure 14:
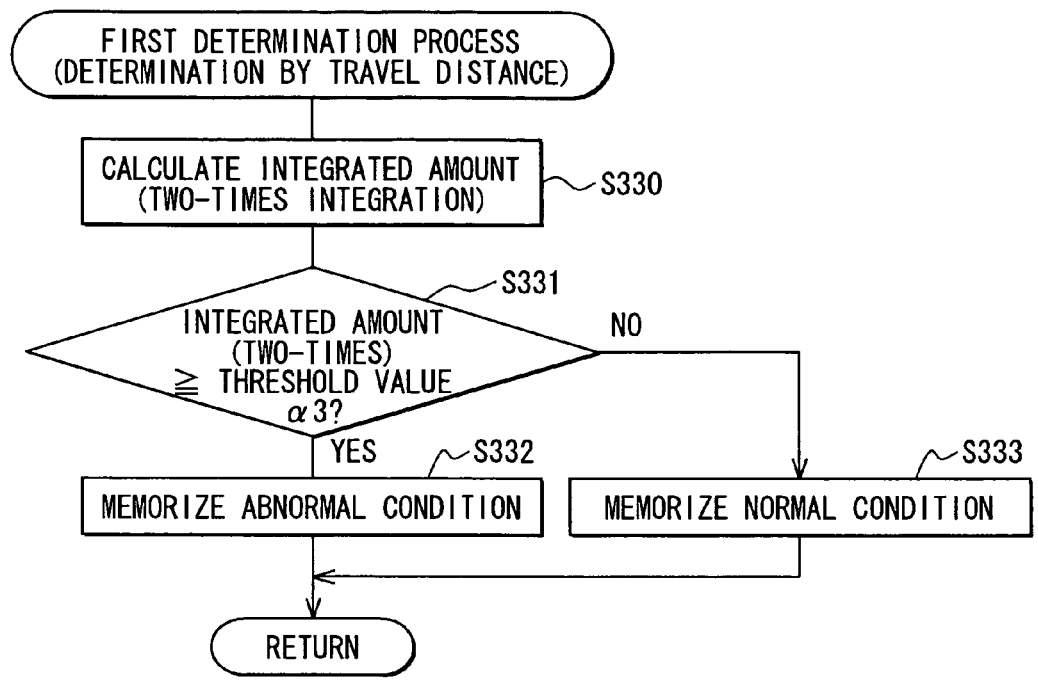
FIG. 14 is a flow chart showing an example of the first determining process, according to which a possible vehicle theft is determined based on a vehicle travel distance.

FIG. 14 is also a flow chart showing an example of the first determination process, according to which the possible vehicle theft is determined by calculating a vehicle travel distance. At a step S330, the calculation portion 131 calculates a current vehicle travel distance by performing the integration of the acceleration by two times.

At a step S331, the determination portion 132 compares the calculated vehicle travel distance (the integrated value by two times) with a predetermined threshold value $\alpha 3$, and determines whether the integrated value by two times is larger than the threshold value $\alpha 3$. And in the similar manner to FIG. 12, the abnormal condition (the integrated value is larger than $\alpha 3$) or the normal condition (the integrated value is smaller than $\alpha 3$) is respectively memorized in the memory portion 133, at a step S332 or S333. And also like the above process of FIG. 12, the ECU 130 determines whether the vehicle is in the normal parking condition or in the possible theft condition based on the information memorized in the memory portion 133, at the step S500 of FIG. 11. The threshold value $\alpha 3$ is likewise decided in consideration of noises.

As above (FIGS. 12 to 14), at least one of the change of the inclined angle, the vehicle speed, and the vehicle travel distance is calculated based on the detected accelerations in the first determination process, and the ECU determines whether the vehicle is in the normal or abnormal condition.

Figure 15:
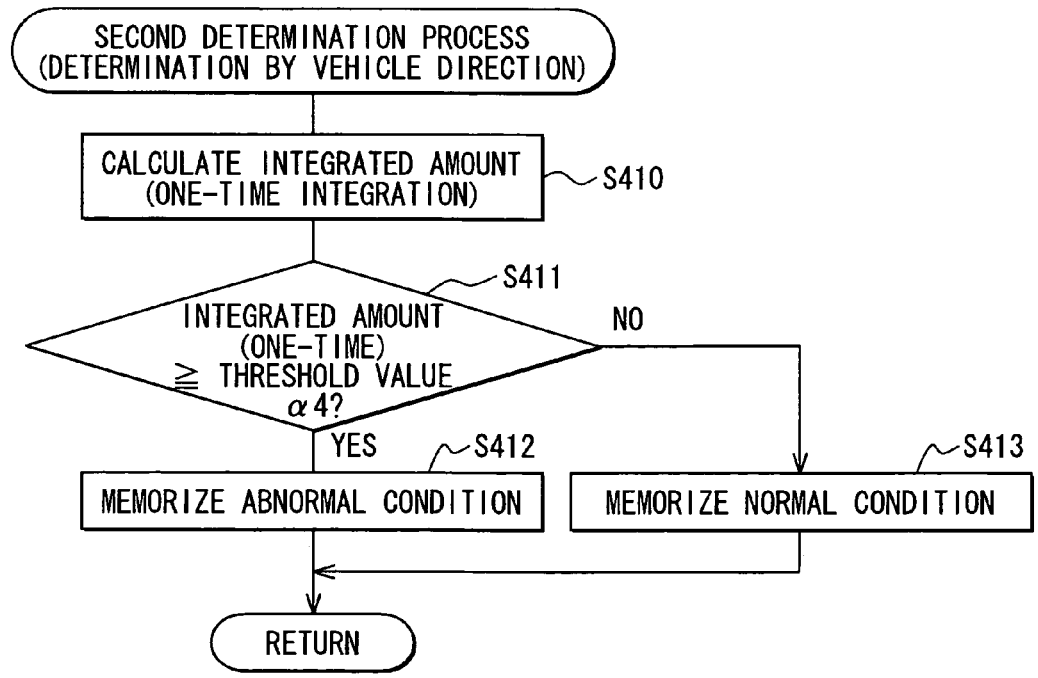
FIG. 15 is a flow chart showing an example of a second determining process, according to which a possible vehicle theft is determined based on a vehicle direction change.

FIG. 15 is a flow chart showing an example of the second determination process, according to which the possible vehicle theft is determined by calculating a direction change of the vehicle.

At a step S410, the calculation portion 131 calculates the current direction of the vehicle by performing the integration of the angular speed by one time.

At a step S411, the determination portion 132 compares the calculated relative vehicle direction (the integrated value by one time) with a predetermined threshold value $\alpha 4$, and determines whether the integrated value by one time is larger than the threshold value α4. And in the similar manner to FIG. 12, the abnormal condition (the integrated value is larger than α4) or the normal condition (the integrated value is smaller than α4) is respectively memorized in the memory portion 133, at a step S412 or S413. And also like the above process of FIG. 12, the ECU 130 determines whether the vehicle is in the normal parking condition or in the possible theft condition based on the information memorized in the memory portion 133, at the step S500 of FIG. 11. The threshold value α4 is likewise decided in consideration of noises with respect to the relative vehicle direction.

As explained above, the antitheft apparatus 10 of the embodiment has the angular speed sensor 120 in addition to the acceleration sensor 110, and determines the possible vehicle theft based on the relative vehicle direction calculated from the output of the angular speed sensor 120. Accordingly, the vehicle movement can be detected by the change of the relative vehicle direction, even when the vehicle is moved with small acceleration. Furthermore, multiple vehicle conditions (the vehicle inclination, vehicle speed, the vehicle travel distance, etc.) can be detected based on the output from the acceleration sensor 110. Accordingly, the function for detecting the possible vehicle theft of the present antitheft apparatus 10 is improved compared with the conventional antitheft apparatus.

In the first determination process (the step S300 in FIG. 11), at least one of the change of the inclined angle, the vehicle speed, and the vehicle travel distance is calculated based on the acceleration from the acceleration sensor 110, to determine whether the vehicle is in the normal condition. The inclination of the vehicle caused by jack-up of the tow truck can be detected by the change of the inclined angle of the vehicle, whereas the movement of the vehicle by the vehicle theft can be detected by the vehicle speed or the vehicle travel distance calculated from the output of the acceleration sensor 110. Thus, the determination accuracy of the possible vehicle theft is improved by detecting multiple vehicle conditions.

When the vehicle travel distance is selected as the determination element in the first determination process (the step S300 of FIG. 11), and the relative direction is selected as the determination element in the second determination process (the step S400 of FIG. 11), the possible vehicle movement can be detected even when the vehicle is moved with the smaller acceleration.

One of the embodiments is explained as above. However, the present invention is not limited to the above embodiment, but various modifications are possible without departing from the spirit of the invention.

In the above embodiment, at least one of the change of the inclined angle, the vehicle speed, and the vehicle travel distance is calculated based on the acceleration signal from the acceleration sensor 110, and selected as the determination element for the first determination process. The acceleration signal itself may be selected as the determination element. In such a case, an impact to be caused at the vehicle theft, or a swinging motion of the vehicle when the vehicle is moved or someone gets inside the vehicle, can be detected.

Furthermore, in the above embodiment, the determination results at the first and second determination processes (the steps S300 and S400) are memorized in the memory portion 133, as shown in FIGS. 12 to 15, and the process for the abnormal condition (the steps S600 and S700 in FIG. 11) is carried out when both of or either one of the determination results indicates the abnormal condition. In other words, the determination process, in which at least one of the change of the inclined angle, the vehicle speed, and the vehicle travel distance is selected as the determination element, and the determination process, in which the relative direction is selected as the determination element, are carried out, and then the process for the abnormal condition is carried out based on the results of those determination processes.

However, the step S500 may be eliminated in the flow chart of FIG. 11, so that the process (the steps S600 and S700) for the abnormal condition is carried out when either one of the determination results at the first and second determination processes (the step S312, S321, S331, S411) indicates the abnormal condition.

Furthermore, in the above embodiment, the integrated value of the acceleration by one time (the vehicle speed) or the integrated value of the acceleration by two times (the vehicle travel distance) is selected as the determination element in the first determination process (S321, S331), and the integrated value is compared with the threshold value α2 or α3.

However, a difference between the vehicle speed and a reference value, or a difference between the vehicle travel distance and another reference value may be compared with threshold value α2 or α3, wherein the reference values may be obtained by performing the integration for the average acceleration during a predetermined period (e.g. 10 seconds) from the first acceleration signal. The reference value may be calculated by performing the integration for the average acceleration during another predetermined period. The integrated value of the previous determination cycle (the vehicle speed of one-time integration or the vehicle travel distance of two-time integration) may be used as the reference value.

Fourth Embodiment

Figure 16:
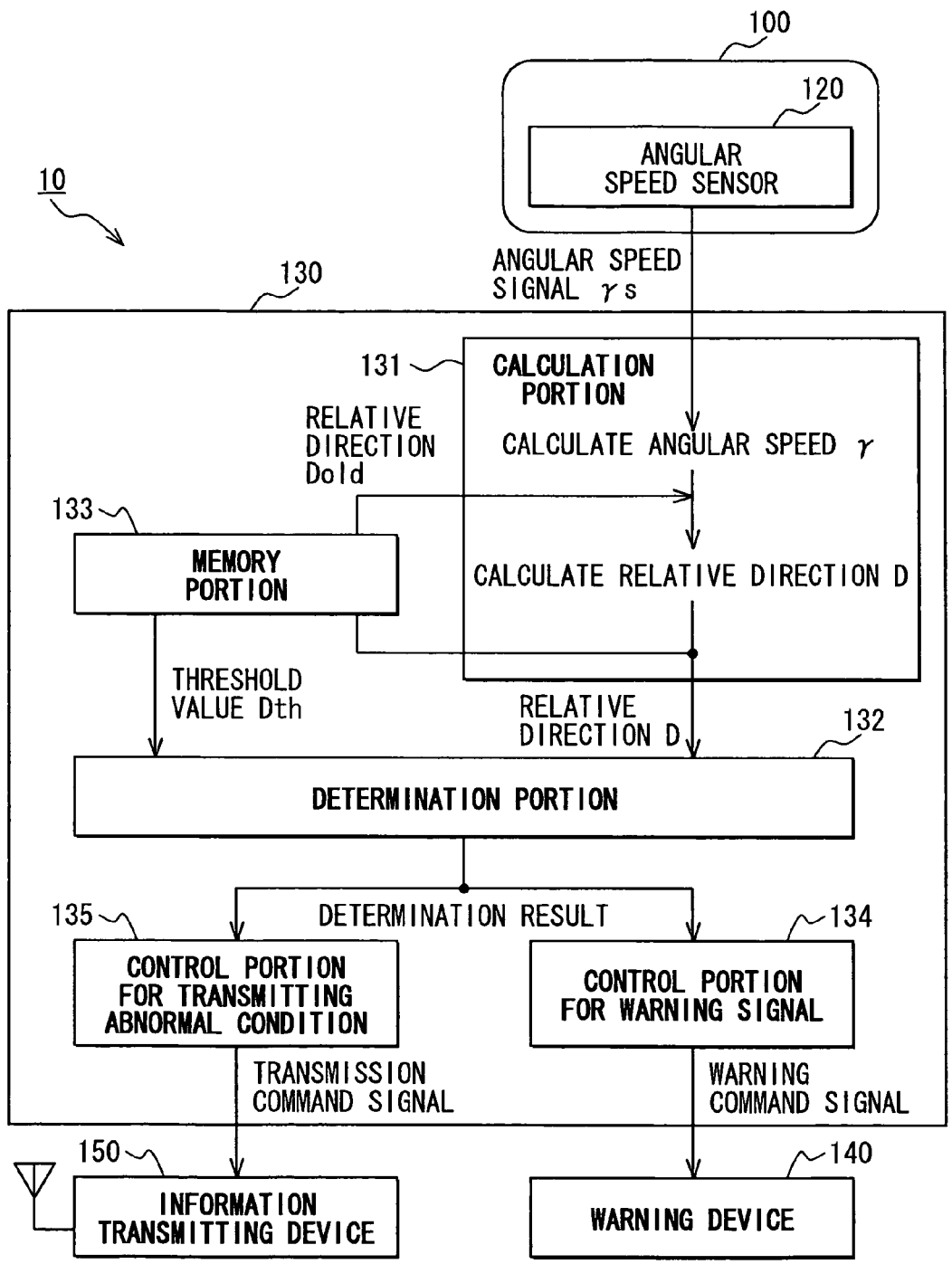
FIG. 16 is a block diagram for an antitheft apparatus according to a fourth embodiment.

FIG. 16 is a block diagram showing a structure of an antitheft apparatus 10 according to a fourth embodiment.

The same reference numerals designate the same or similar portion to the embodiment shown in FIG. 10. The embodiment of FIG. 16 differs from FIG. 10 in that an inertia sensor 100 is provided in place of the acceleration sensor 110 and the angular speed sensor 120. However, the inertia sensor 100 has a function as the angular speed sensor 120.

The inertia sensor 100 (the angular speed sensor 120) is provided on a vehicle floor adjacent to a center of gravity of the vehicle, so that the inertia sensor 100 detects the angular speed around the yaw axis in the plane parallel to the vehicle floor.

Figure 17:
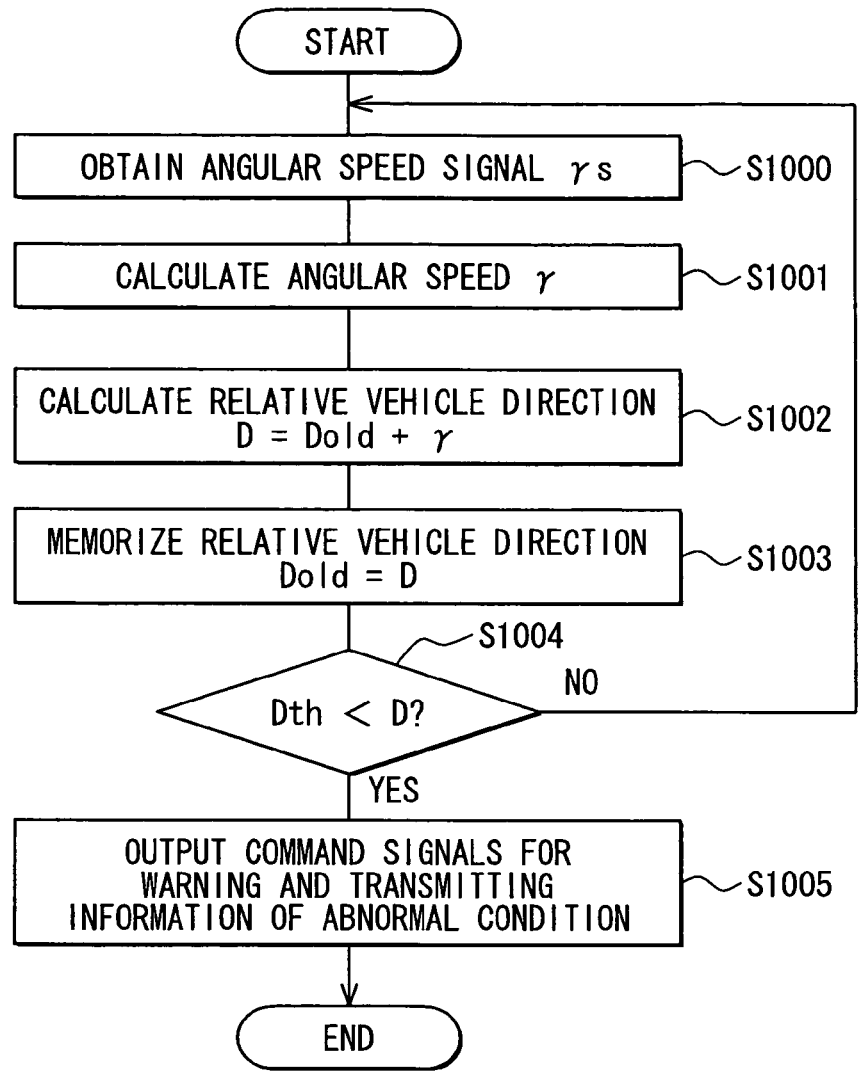
FIG. 17 is a flow chart showing a process carried out by ECU in the fourth embodiment.

FIG. 17 is a flow chart showing an example for detecting an abnormal condition by the antitheft apparatus 10. A control cycle (detection frequency) of the process shown in FIG. 17 is, for example, one minute. The first control cycle starts when the ignition switch is turned off (the security mode is turned on), and then the process of FIG. 17 is periodically (for every one minute) repeated.

At a step S1000, the calculation portion 131 receives an angular speed signal γs from the angular speed sensor 120. At a step S1001, the calculation portion 131 calculates an angular speed γ based on the angular speed signal γs. At a step S1002, the calculation portion 131 calculates a relative vehicle direction D, which is obtained by adding the calculated angular speed γ to a relative vehicle direction Dold in the previous control cycle. The relative vehicle direction Dold in the previous control cycle is memorized in the memory portion 133. At a step S1003, the calculated relative vehicle direction D is memorized in the memory portion 133, which will be used for the next cycle as the relative vehicle direction Dold in the previous control cycle. At a step S1004, the determination portion 132 compares the relative vehicle direction D with a threshold value Dth. When the relative vehicle direction D is larger than the threshold value Dth, the process goes to a step S1005. When the relative vehicle direction D is not larger than the threshold value Dth, the process returns to the step S1000, so that the process is repeated at the next control cycle.

At the step S1005, the control portion 134 operates the warning device 140 for emitting the warning sound toward the outside of the vehicle, and the control portion 135 operates the information transmitting device for transmitting the information for the possible vehicle theft to the terminal of the cellular phone or the security company.

The above threshold value Dth is decided by taking the noises into consideration. For example, the threshold value Dth is 5°. When the noise level is smaller, the threshold value may be selected as 1°. The threshold value is practically selected from a range of 0.5° to 90°.

Accordingly, the vehicle movement can be detected by the change of the relative vehicle direction D, even when the vehicle is jacked up and moved away by the tow truck with small acceleration.

In the antitheft apparatus having the acceleration sensor, the determination of the possible vehicle theft is likely to be affected by the component of the acceleration generated by the swinging of the vehicle caused by the wind. Accordingly, a noise margin is added to the threshold value for determining the possible vehicle theft, in order to avoid an erroneous determination due to the swinging of the vehicle by the wind. Therefore, the noise margin is decided by taking into consideration the swinging of the vehicle by the wind.

According to the embodiment, however, the angular speed sensor 120 is used, which is hardly affected by the swinging of the vehicle by the wind. As a result, an amount of the noise margin for the threshold value Dth can be made smaller in this embodiment than the case in which the acceleration sensor is used for the determination of the possible vehicle theft. Namely, the determination accuracy can be improved.

Although, in the above embodiment, the threshold value Dth is used as the fixed value, the threshold value may not be the fixed value. For example, a switch may be provided in the vehicle, so that a vehicle driver may change the threshold value Dth in order that the sensibility for the determination of the vehicle theft is arbitrarily changed. Accordingly, the vehicle driver may set the threshold value Dth as a lower value, when he parks the vehicle in such a place in which heavy-duty vehicles frequently pass through and the road surface is thereby quaked.

Furthermore, in the above embodiment, the relative vehicle direction D is calculated based on the angular speed γ from the angular speed sensor 120, in order to determine the possible vehicle theft. However, since the angular speed γ of the vehicle is not usually changed during the parking condition, the angular speed γ may be directly used as the determination factor, without calculating the relative vehicle direction D from the angular speed γ.

In addition, in the antitheft apparatus 10 of the above embodiment, the angular speed sensor 120 included in the inertia sensor 100 for the VDIM (vehicle dynamics integrated management) system is commonly used for the antitheft system, so that the antitheft apparatus 10 can be made smaller in size. The angular speed sensor 120 is generally mounted in the vehicle at such a location, for example, under a center console, which is adjacent to the center of gravity in the vehicle, in order to improve the detection accuracy. Accordingly, the angular speed sensor 120 is hardly found out and destroyed by a criminal person, before jacking up the vehicle.

Fifth Embodiment

Figure 19:
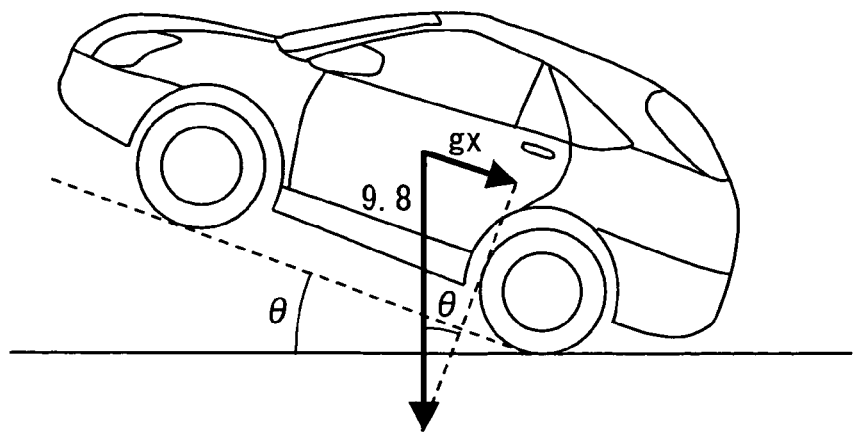
FIG. 19 is a schematic view showing a relation between an acceleration signal gx from an acceleration sensor used in the fifth embodiment and an inclined angle θ.
Figure 18:
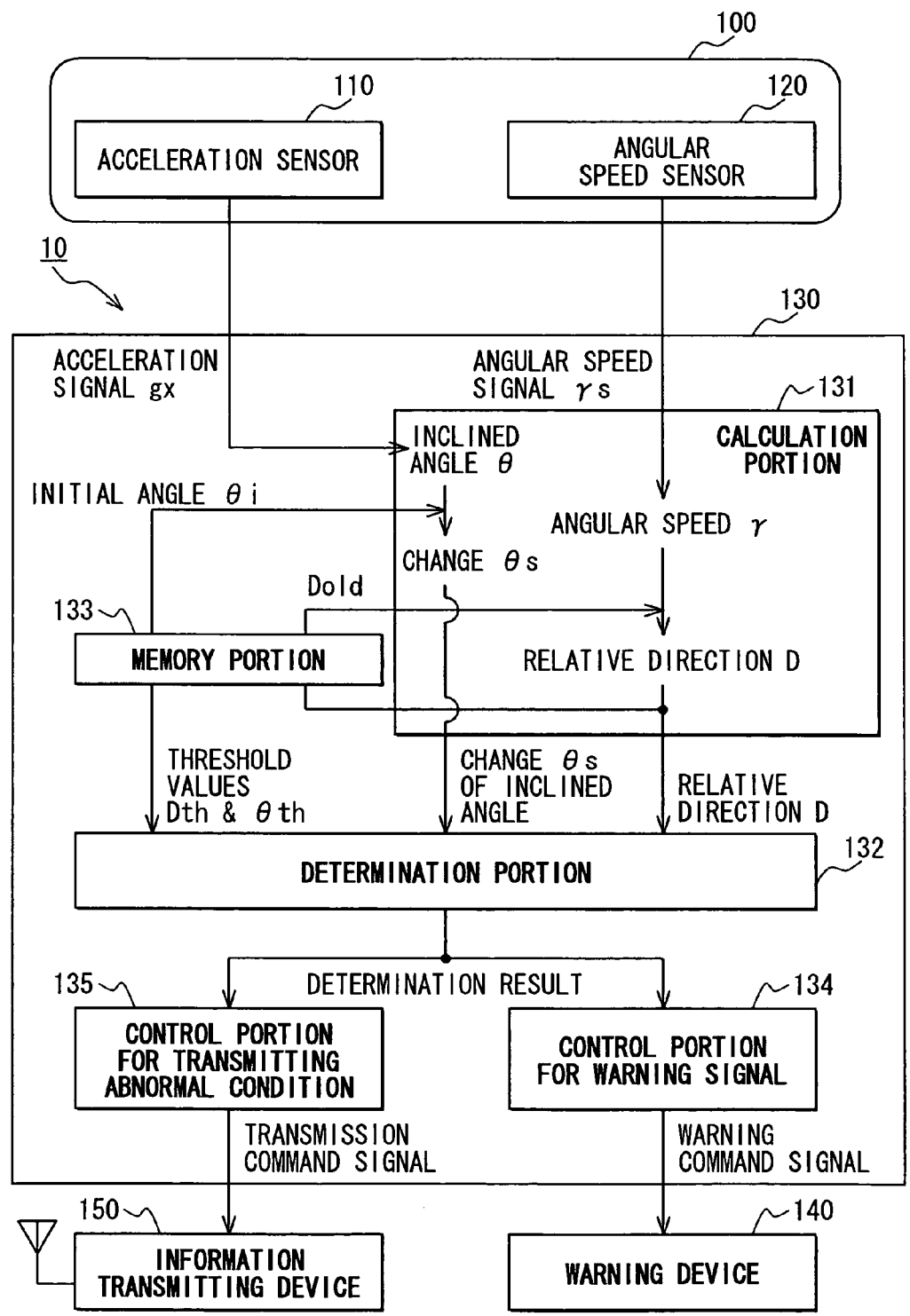
FIG. 18 is a block diagram for an antitheft apparatus according to a fifth embodiment.
Figure 20:
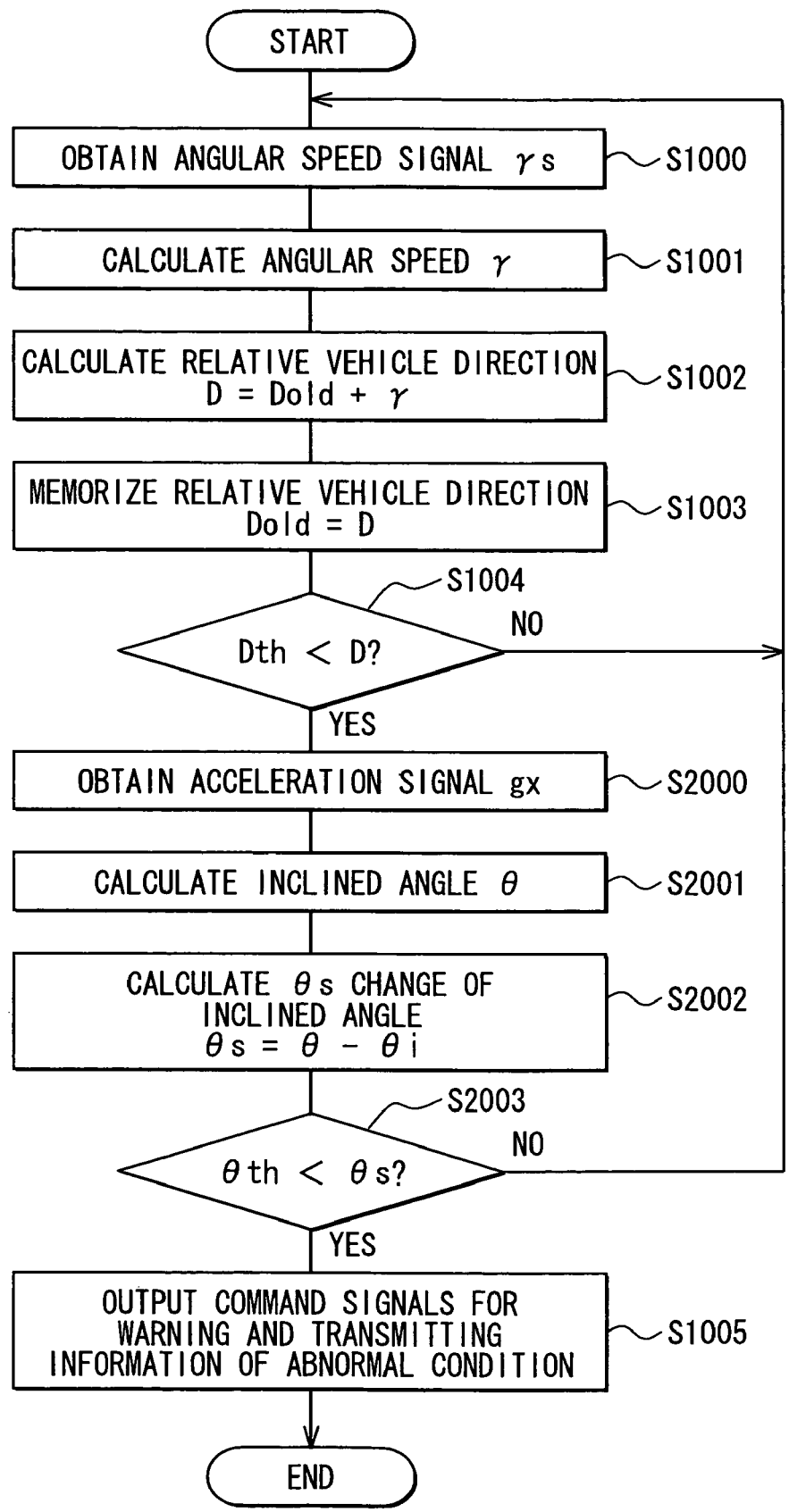
FIG. 20 is a flow chart showing a process carried out by ECU in the fifth embodiment.

A fifth embodiment will be explained with reference to FIGS. 18 to 20. This embodiment differs from the above embodiment (FIGS. 16 and 17) in that the acceleration signal from the acceleration sensor 110 of the inertia sensor 100 is also used for determination of the possible vehicle theft. In FIGS. 18 to 20, the same reference numerals designate the same or similar portion to the embodiment shown in FIGS. 16 and 17

FIG. 18 shows a structure of the antitheft apparatus 10. The acceleration signal gx is inputted into the calculation portion 131, in addition to the angular speed signal ys. The calculation portion 131 calculates the inclined angle θ of the vehicle based on the acceleration signal gx, wherein the inclined angle θ is the angle of the vehicle with respect to the horizontal plane.

As shown in FIG. 19, the acceleration signal gx is the acceleration generated in the plane parallel to the vehicle floor. When the vehicle is parked in the flat (horizontal) road surface, no acceleration (gx=0) is generated at the acceleration sensor 110. When the vehicle is inclined, for example by the jack up, by the angle θ with respect to the horizontal plane, the acceleration is generated, wherein gx=the gravitational acceleration X sin θ. The inclined angle θ can be, therefore, obtained by the formula:

$$\theta = \sin^{-1}(gx/\text{the gravitational acceleration})$$

FIG. 20 is a flow chart showing an example for detecting an abnormal condition (the possible vehicle theft) by the antitheft apparatus 10. A control cycle of the process shown in FIG. 20 is, for example, one-point-five minute. The first control cycle starts when the ignition switch is turned off (the security mode is turned on), and then the process of FIG. 20 is periodically repeated. The inclined angle of the vehicle, when the ignition switch is turned off, is calculated in accordance with the process of FIG. 20 and memorized in the memory portion 133 as the reference angle θi.

The steps S1000 to S1004 are identical to the steps S1000 to S1004 of FIG. 17.

At a step S2000, the calculation portion 131 receives the acceleration signal gx from the acceleration sensor 110. At a step S2001, the calculation portion 131 calculates the inclined angle θ of the vehicle based on the acceleration signal gx. At a step S2002, the calculation portion 131 calculates a change θs of the inclined angle, namely the calculation portion 131 calculates how much angle of the vehicle is changed since the security mode is turned on. The change θs of the inclined angle is obtained by deducting the reference angle θi from the current angle θ. At a step S2003, the determination portion 132 compares the change θs of the inclined angle with a threshold value θth. When the change θs of the inclined angle is larger than the threshold value θth, the process goes to the step S1005. When the change θs of the inclined angle is not larger than the threshold value θth, the process returns to the step S1000, so that the process is repeated at the next control cycle.

At the step S1005, the warning device 140 as well as the information transmitting device 150 is operated by the respective control portions 134 and 135, as in the same manner to the process (the step S1005) of FIG. 17.

As above, according to the antitheft apparatus 10 of FIGS. 18 to 20, the determination for the possible vehicle theft is carried out by the acceleration signal from the acceleration sensor 110 in addition to the signal from the angular speed sensor 120. Accordingly, the detection accuracy can be further improved. For example, the threshold value Dth of the apparatus of FIGS. 18 to 20 can be made smaller than the threshold value Dth of the apparatus shown in FIGS. 16 and 17. Furthermore, when compared with the antitheft apparatus having only the acceleration sensor, the threshold value θth of the embodiment can be likewise made smaller. For example, θth may be between 5° to 15°.

In addition, according to the above embodiment, the change θs of the inclined angle is used for the determination of the possible vehicle theft. Therefore, the determination method is hardly affected by the swinging of the vehicle to be caused by the wind. In other words, the erroneous determination can be suppressed, even when the acceleration is temporally generated at the vehicle by the wind. The control cycle for the process of FIG. 20 can be made longer than the process of FIG. 17, because the detection accuracy is higher than that of the apparatus shown in FIGS. 16 and 17. As a result, an energy consumption can be suppressed to a smaller amount.

Sixth Embodiment

Figure 21:
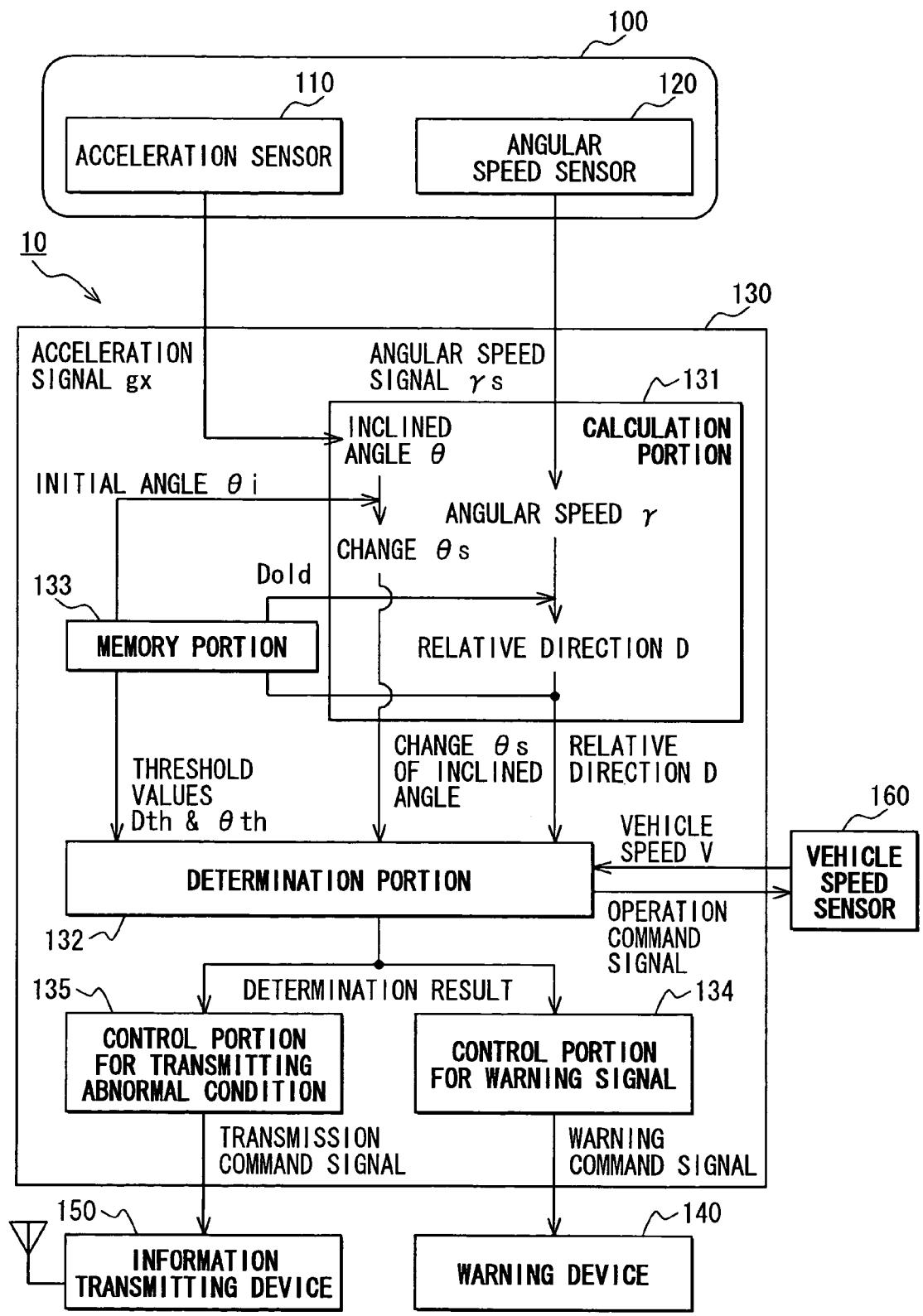
FIG. 21 is a block diagram for an antitheft apparatus according to a sixth embodiment.
Figure 22:
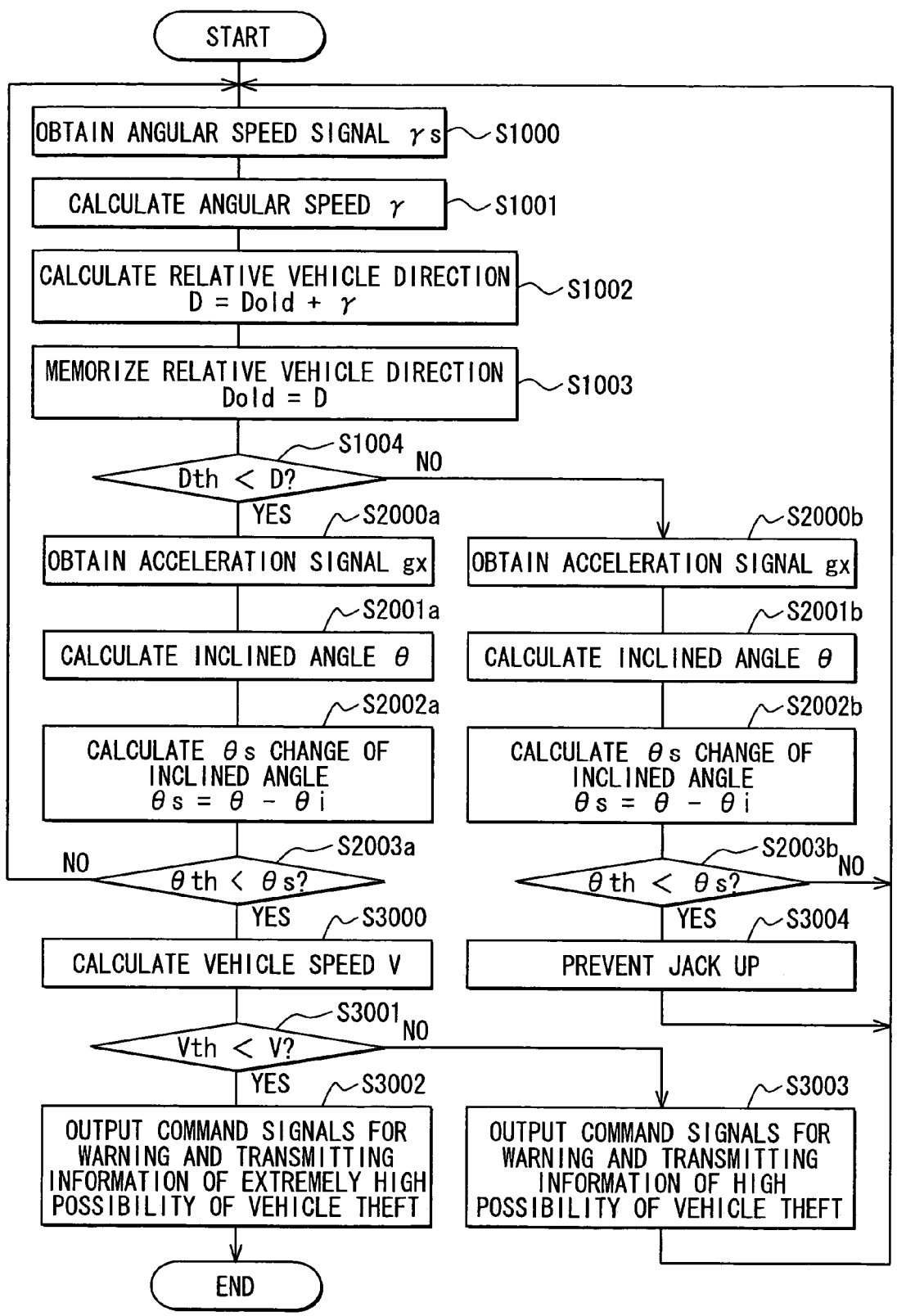
FIG. 22 is a flow chart showing a process carried out by ECU in the sixth embodiment.

A sixth embodiment will be explained with reference to FIGS. 21 and 22. This embodiment differs from the above embodiment (FIGS. 18 to 20) in that a vehicle speed V is used for determination of the possible vehicle theft, in addition to the angular speed and the acceleration of the vehicle. In FIGS. 21 and 22, the same reference numerals designate the same or similar portion to the embodiment shown in FIGS. 18 to 20.

FIG. 21 shows a structure of the antitheft apparatus 10. The vehicle speed V is inputted to the determination portion 132 from a vehicle speed sensor 160. The vehicle speed sensor 160 is not operated all the times, but operated when a certain condition is met, as explained below. The vehicle speed sensor 160 is provided at a rear wheel for a front drive vehicle, at a front wheel for a rear drive vehicle, and at front and rear wheels for a four wheel drive vehicle. Accordingly, when the vehicle is jacked up by the tow truck at its driving wheels while the driven wheels are in contact with the ground surface, the vehicle travel distance can be detected based on the vehicle speed V from the vehicle speed sensor 160 provided at the driven wheel.

FIG. 22 is a flow chart showing an example for detecting an abnormal condition (the possible vehicle theft) by the antitheft apparatus 10. A control cycle of the process shown in FIG. 22 is, for example, two minutes. The first control cycle starts when the ignition switch is turned off (the security mode is turned on), and then the process of FIG. 22 is periodically repeated.

The steps S1000 to S1003 are identical to the steps S1000 to S1003 of FIG. 20. At a step S1004, when the relative vehicle direction D is larger than the threshold value Dth, the process goes to a step S2000a. When the relative vehicle direction D is not larger than the threshold value Dth, the process goes to a step S2000b.

The steps S2000a to S2002a are the same to the steps S2000 to S2002 of FIG. 20. When the change θs of the inclined angle larger than the threshold value θth, the process goes from a step S2003a to a step S3000. When the change θs of the inclined angle is not larger than the threshold value θth, the process returns from the step S2003a to the step S1000, so that the process is repeated at the next control cycle. When the determination result is NO at the step S2003a, the vehicle is in such a condition, in which the relative vehicle direction is changed but the vehicle is not relatively inclined. This occurs, for example, in the case that the vehicle is parked in a tower parking lot and rotated on a turn table.

At a step S3000, the vehicle speed sensor 160 is activated to obtain the vehicle speed V from the vehicle speed sensor 160. At a step S3001, the determination portion 132 compares the current vehicle speed V with a threshold value Vth. When the current vehicle speed V is larger than the threshold value Vth, the process goes to a step S3002, whereas when the current vehicle speed V is not larger than the threshold value Vth, the process goes to a step S3003. At the step S3002, the control portions 134 and 135 output control signals to the warning device 140 and the information transmitting device 150, so that the warning sound indicating that the vehicle is in a high possibility of the vehicle theft is emitted from the warning device 140, and the information indicating that the vehicle is in the high possibility of the vehicle theft is transmitted from the information transmitting device 150. The reason why the vehicle is in the high possibility of the vehicle theft is that the inclined angle of the vehicle as well as the relative vehicle direction has been changed and the vehicle speed is higher than the predetermined threshold value, even in spite that the vehicle must be in the parking condition.

At the step S3003, the control portions 134 and 135 output control signals to the warning device 140 and the information transmitting device 150, so that the warning sound indicating that the vehicle is in a possibility of the vehicle theft is emitted from the warning device 140, and the information indicating that the vehicle is in the possibility of the vehicle theft is transmitted from the information transmitting device 150. This is because the inclined angle of the vehicle as well as the relative vehicle direction has been changed, whereas the vehicle speed V is not higher than the predetermined threshold value Vth. In other words, it can be presumed that the vehicle is stolen at a low speed, because the inclined angle of the vehicle as well as the relative vehicle direction has been changed, even in spite that the vehicle must be in the parking condition.

According to the embodiment, the threshold value Vth is selected as a value of 1 m/sec. However, the threshold value Vth may be selected from a range from 0.5 to 16 m/sec. The transporting speed of the vehicle, which is jacked up and carried by the tow truck, is generally lower than 20 m/sec. Accordingly, when the detected vehicle speed V is higher than 20 m/sec, the determination portion 132 may determine that the vehicle speed sensor 160 is in the abnormal condition.

As above, the vehicle speed is used as the determination element in addition to the angular speed and the acceleration of the vehicle. Thus, the detection accuracy is further improved. Although not shown in the flow chart of FIG. 22, the vehicle travel distance may be calculated because the vehicle speed V is detected. And such vehicle travel distance may be transmitted from the information transmitting device 150. The vehicle speed sensor 160 is generally mounted in the vehicle for the purpose of performing the other vehicle control systems, such as ABS (anti-lock braking system), VDIM system (vehicle dynamics integrated management), and so on. Accordingly, no specific vehicle speed sensor is necessary to be mounted in the vehicle for the purpose of performing the antitheft function.

Seventh Embodiment

Figure 23:
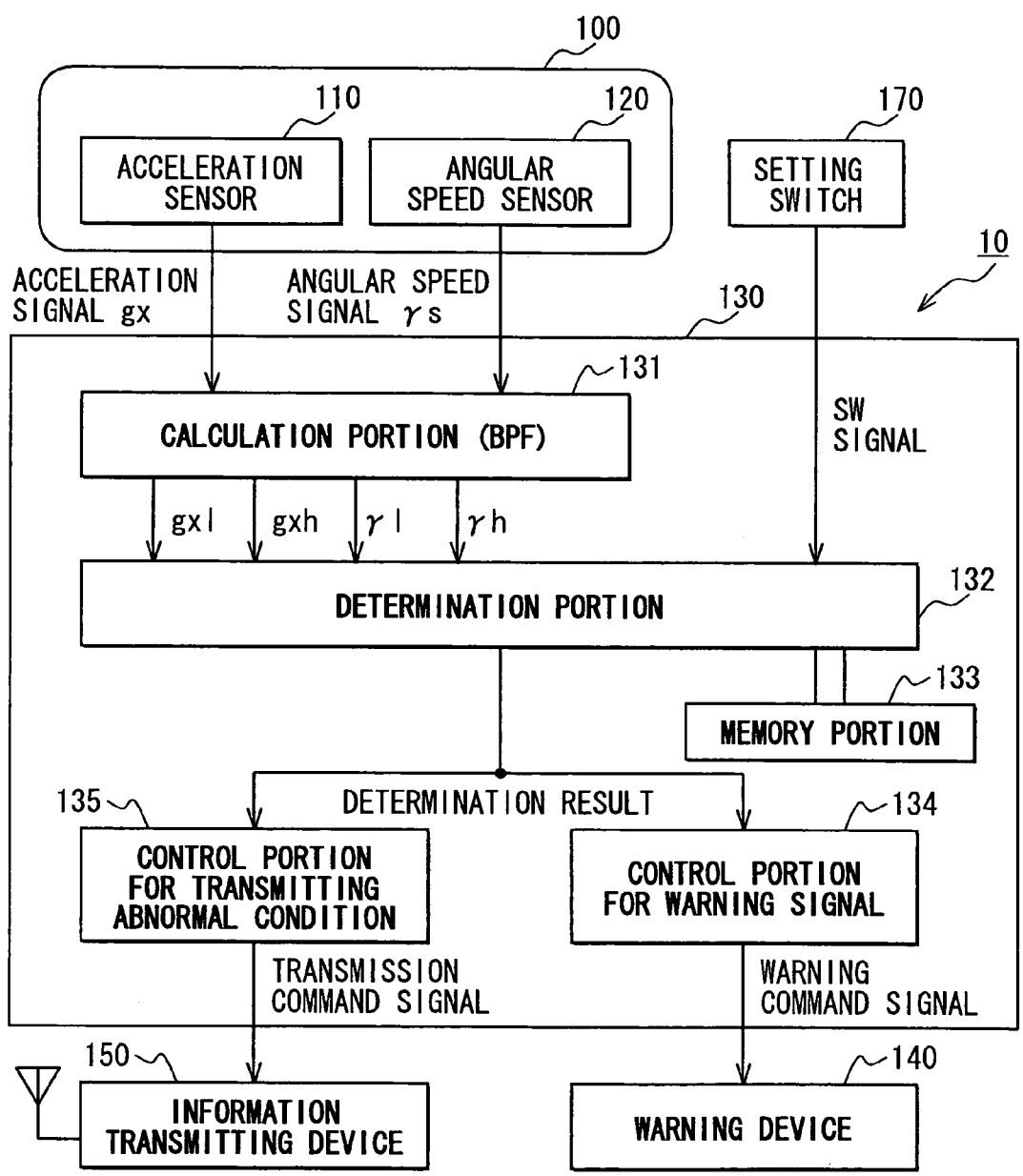
FIG. 23 is a block diagram for an antitheft apparatus according to a seventh embodiment.

A seventh embodiment will be explained with reference to FIGS. 23 and 24. This embodiment differs from the above embodiment (FIGS. 18 to 20) in that a setting switch 170 for selecting an antitheft operational mode is provided and the angular speed signal ys as well as the acceleration signal gx is filtered by a band-pass filter. In FIGS. 23 and 24, the same reference numerals designate the same or similar portion to the embodiment shown in FIGS. 18 to 20.

FIG. 23 shows a structure of the antitheft apparatus 10. The band-pass filter BPS is provided in the ECU 130 (in the calculation portion 131). The band-pass filter BPS picks out a low-frequency component gxl (e.g. 0.1 Hz, in a range of 0.05 to 0.2 Hz) and a high-frequency component gxh (e.g. 100 Hz, in a range of 80 to 200 Hz) from the acceleration signal gx of the sensor 110. Further, the band-pass filter BPS likewise picks out a low-frequency component γl (e.g. 0.1 Hz, in a range of 0.05 to 0.2 Hz) and a high-frequency component γh (e.g. 100 Hz, in a range of 80 to 200 Hz) from the angular speed signal γs of the sensor 120. The calculation portion (BPF) outputs those frequency components (gxl, gxh, γl, γh) to the determination portion 132. The setting switch 170, which is for example a dial-type switch, is provided in a vehicle passenger compartment, adjacent to an instrument panel. The antitheft operational mode of the apparatus 10 is selected by rotating the setting switch 170 by the vehicle driver, depending on a circumstance of the parking place. An output signal from the setting switch 170 is inputted to the ECU 130 (to the determination portion 132).

As shown in FIG. 24, the setting switch 170 has four antitheft operational modes. The mode "OFF" is a mode, in which the antitheft apparatus 10 is not operated.

The mode "1" is a mode, which is selected when the mode "2" or "3" is not necessary, wherein the determination portion 132 determines the possible vehicle theft when the vehicle is moved (vibrated) even in a small degree and the relative vehicle direction is largely changed. Namely, the determination portion 132 does not determine the possible vehicle theft, for example when the vehicle is parked in the tower parking lot, in which the vehicle is not inclined but rotated. In the mode "1", the frequency components of gxl and γh are used as the determination elements, wherein a large frequency component gxl is obtained when the vehicle is vibrated even with the small amount, whereas a large frequency component γh is obtained when the relative vehicle direction is largely changed.

Alternatively, the frequency components gxl and gxh may be used as the determination elements, wherein large frequency components gxl and gxh are obtained when the vehicle is largely inclined.

The mode "2" is selected, when the vehicle is parked, for example, at such a place, in which heavy-duty vehicles frequently pass through. In the mode "2", the determination portion 132 determines the possible vehicle theft, when the vehicle is largely swung (inclined) and the angular speed is changed. The frequency components gxh and γh are used for the determination elements, wherein the large frequency component gxh is obtained when the vehicle is largely swung or quickly inclined. The large frequency component γh is obtained when the vehicle direction is largely changed. Accordingly, in the mode "2", the determination portion 132 does not determine the possible vehicle theft, when the traveling vibration of the heavy-duty vehicle is applied to the parking vehicle and thereby the vehicle is largely swung.

The mode "3" is selected when the vehicle is parked in a residential block, in which an erroneous determination of the vehicle theft should be avoided as much as possible. In the mode "3", the warning process and the information transmitting process is performed shortly before or only after the vehicle theft. In the mode "3", the frequency components gxl and γl are used for the determination elements, wherein the large frequency component gxl is obtained when the vehicle is inclined even with a slow movement, and the large frequency component γl is obtained when the relative vehicle direction is changed even in a small amount.

Alternatively, the frequency component γh or gxh may be added to the determination element, wherein the large frequency component γh is obtained when the relative vehicle direction is largely changed, and the large frequency component gxh is obtained when the vehicle is quickly inclined.

As above, the antitheft operational mode can be selected among multiple modes depending on the parking circumstance, and the possible vehicle theft is determined according to the selected operational mode. Accordingly, the erroneous determination can be reduced.

In this embodiment the setting switch 170 is manually operated by the vehicle driver. However, the antitheft operational mode may be automatically selected, when a car navigation system is provided in the vehicle and the parking circumstance is detected by such car navigation system.

Eighth Embodiment

An eighth embodiment will be explained with reference to FIGS. 25 to 28. This embodiment differs from the above embodiment (FIGS. 18 to 20) in that a pitching sensor 180 is provided. In FIGS. 25 to 28, the same reference numerals designate the same or similar portion to the embodiment shown in FIGS. 18 to 20.

Figure 25:
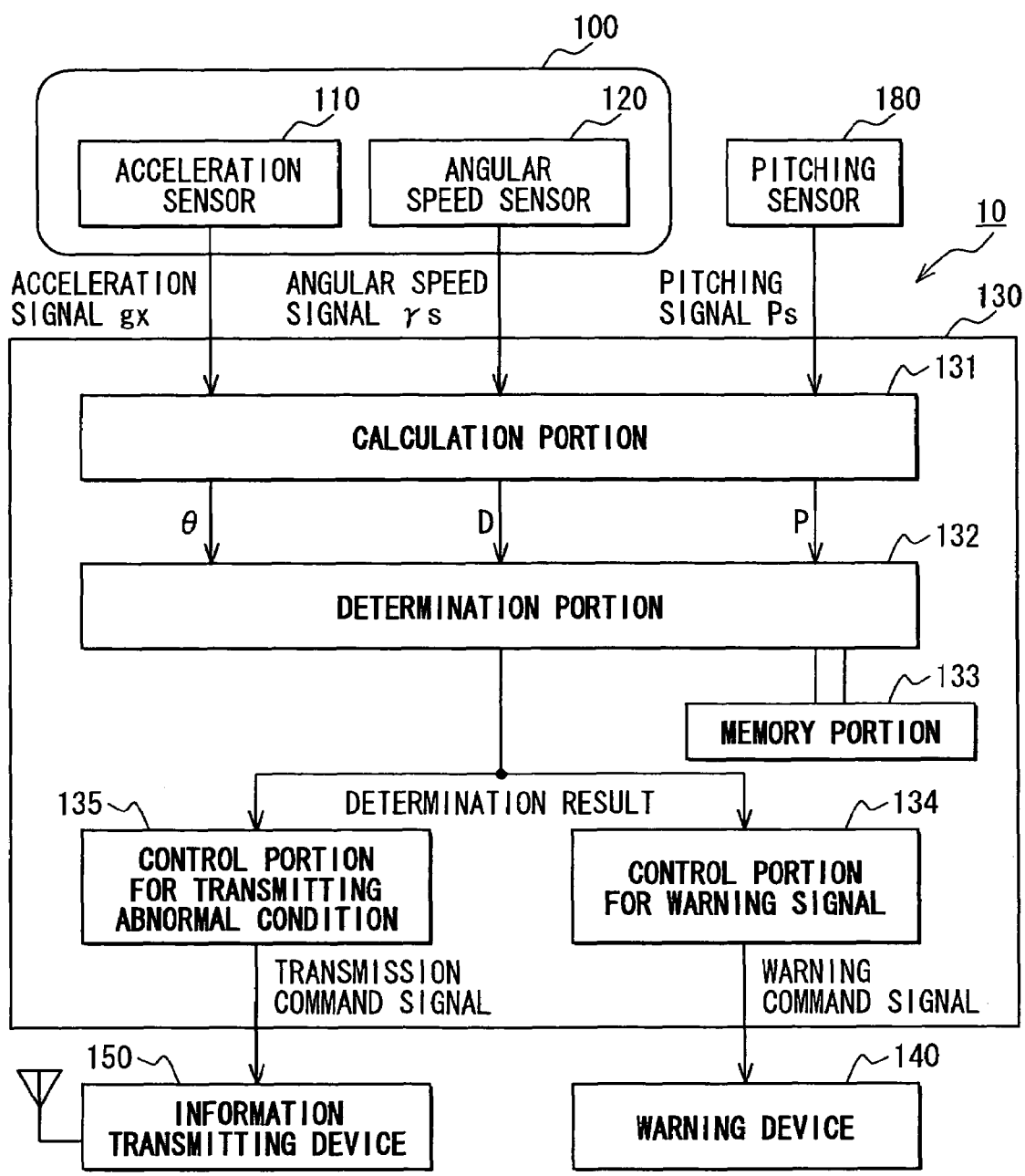
FIG. 25 is a block diagram for an antitheft apparatus according to an eighth embodiment.

FIG. 25 shows a structure of the antitheft apparatus 10. The pitching sensor 180 is provided for detecting a pitching amount of the vehicle in the longitudinal (F-B) direction, wherein the detected pitching amount is used for the VDIM system for the vehicle. This pitching sensor 180 is also used for the antitheft apparatus 10 of the invention. An output signal Ps from the pitching sensor 180 is inputted to the calculation portion 131 of the ECU 130, when the security mode is turned on. A pitching rate P is inputted to the determination portion 132, in addition to the inclined vehicle angle θ and the relative vehicle direction D.

Figure 26:
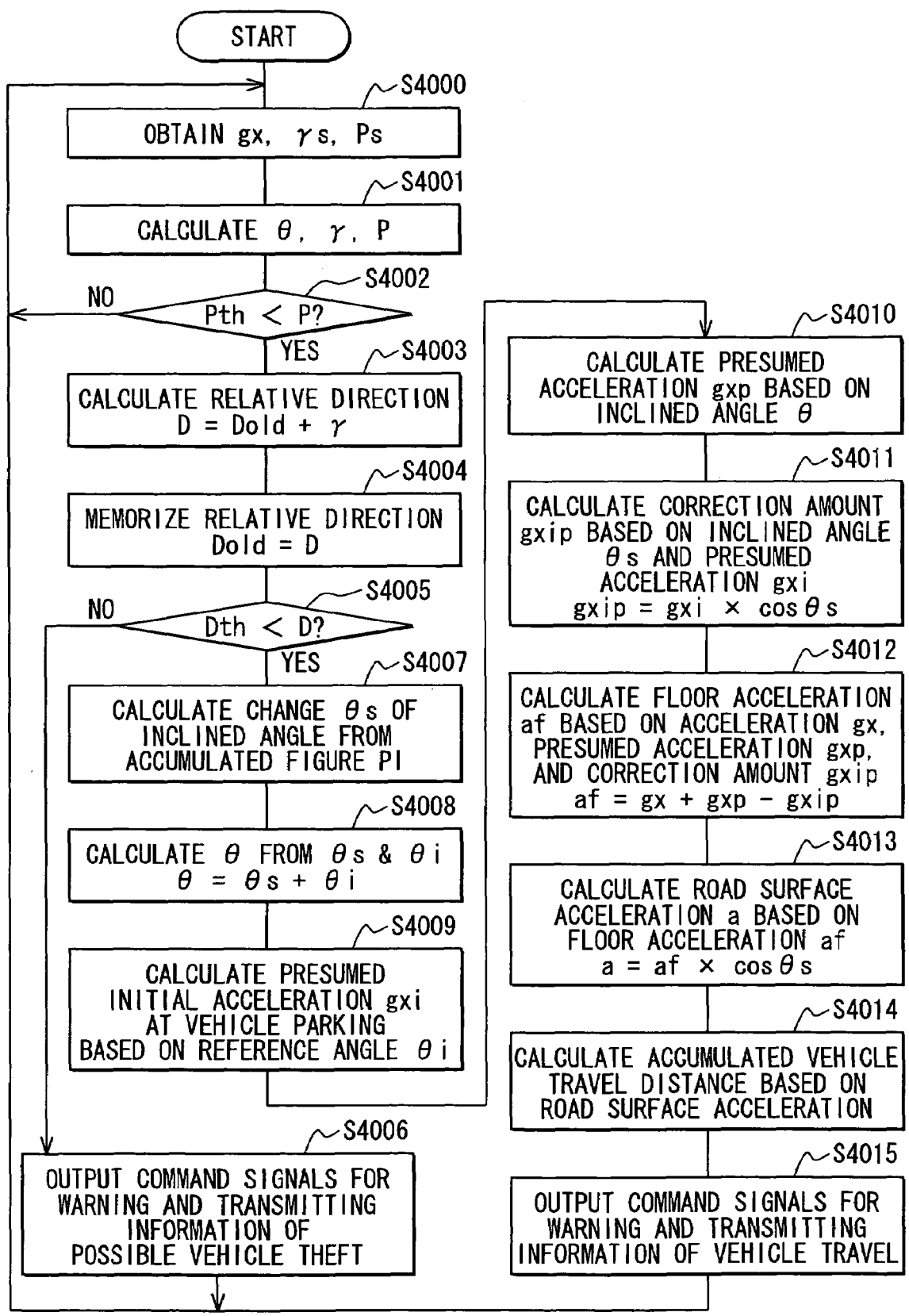
FIG. 26 is a flow chart showing a process carried out by ECU in the eighth embodiment.

A process performed by the calculation portion 131 and the determination portion 132 will be explained with reference to the flowchart of FIG. 26. A determination cycle of the process in FIG. 26 is three minutes. When the ignition switch is turned off (the security mode is turned on), the process of FIG. 26 is periodically repeated for every three minutes.

At a step S4000, the calculation portion 131 obtains the acceleration signal gx from the sensor 110, the angular speed signal γs from the sensor 120, and the pitching signal Ps from the sensor 180. At a step S4001, the calculation portion 131 calculates the inclined vehicle angle θ, the angular speed γ, and the pitching rate P, respectively from the above the acceleration signal gx, the angular speed signal γs, and the pitching signal Ps. At a step S4002, the determination portion 132 compares the pitching rate P with a threshold value Pth. When the pitching rate P is larger than the threshold value Pth, the process goes to a step S4003, and if not, the process goes back to the step S4000.

The steps S4003 and S4004 are identical to the steps S1002 and S1003 of FIG. 20. Therefore, when the relative vehicle direction D is larger than the threshold value Dth, the process goes to a step S4007, and if not the process goes to a step S4006. At the step S4006, the control portion 135 operates the information transmitting device 150, so that such information indicating that the possibility of the vehicle theft exists is transmitted. This is because there is a change of the vehicle inclination (a pitching is generated), although the relative vehicle direction is not changed or slightly changed.

In the case that the process goes to the step S4007, there is the change of the vehicle inclination (the pitching is generated), and the relative vehicle direction is changed. Therefore, there is a high possibility of the vehicle theft in this situation. At the steps S4007 to S4014, the ECU 130 (the determination portion 132) calculates a vehicle travel distance (an accumulated travel distance from the parking time point). A calculation method of the vehicle travel distance will be explained with reference to FIGS. 27A and 27B.

Figure 27A:
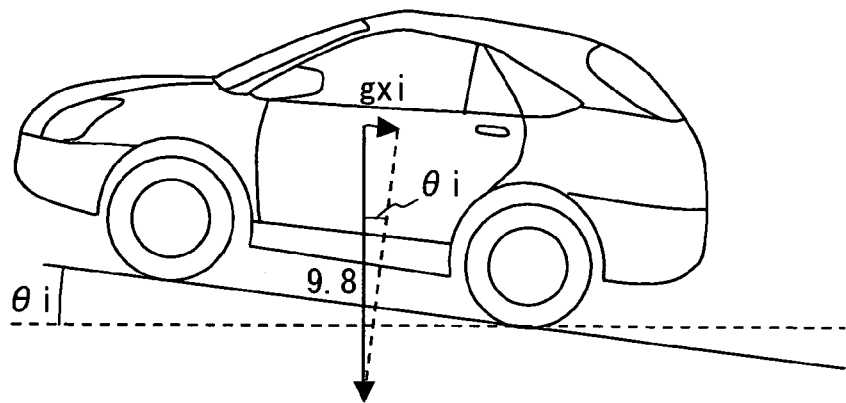
FIG. 27A is a schematic view showing a vehicle parking on a road, which is inclined with a horizontal plane by an angle of θi.

FIG. 27A shows a condition of the vehicle at its parking time point, wherein the vehicle is parked on a road surface inclined by an angle of θi with respect to the horizontal plane. This inclined angle θi of the vehicle is memorized in the memory portion 133 as a reference inclined angle θi, when the ignition switch is turned off (the security mode is turned on). When the inclined angle θi is fixed, the gravitational acceleration gxi, which is applied to the vehicle in a vehicle floor, can be presumed. The acceleration gxi is referred to as an initial presumed acceleration.

Figure 27B:
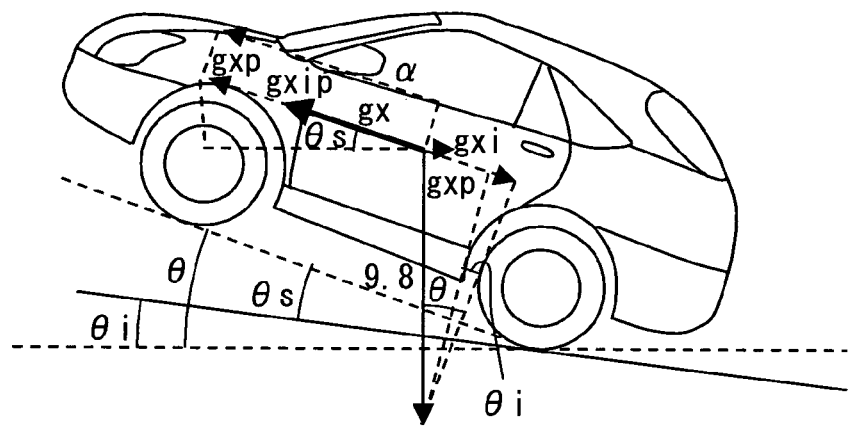
FIG. 27B is a schematic view showing a vehicle, which is jacked up by an angle of θs.

When the vehicle is jacked up by an angle θs from the position of FIG. 27A, as shown in FIG. 27B, the acceleration signal gx from the acceleration sensor 110 must be changed to gxp, if the vehicle is not traveled. The acceleration gxp can be calculated by use of an angle θ, which is an inclined angle of the vehicle with respect to the horizontal plane. The angle θ is a value obtained by adding the change θs of the inclination to the reference value θi. The acceleration actually increased by the jack-up by the angle θs is obtained by deducting a cosine component of the initial presumed acceleration gxi from the acceleration gxp.

When the vehicle is jacked up by the angle θs and moved by the tow truck, as shown in FIG. 27B, the acceleration gx to be detected at the acceleration sensor 110 includes the acceleration (gxp−gxi) generated by the jack-up of the vehicle and a floor acceleration af, which is generated by the movement (travel) of the vehicle in the plane of the vehicle floor. In FIG. 27B, the vehicle is moved on the road surface, which is inclined by the angle θi with respect to the horizontal plane. An acceleration in the plane parallel to the road surface is a cosine component of the floor acceleration af. Accordingly, the road surface acceleration a, which is generated by the travel of the vehicle in the plane parallel to the road surface, is calculated by the following formula:

the road surface acceleration $a = af \times \cos \theta s$

The vehicle travel distance moved by the tow truck can be obtained by performing the integration of the road surface acceleration a, because the road surface acceleration a is the acceleration with respect to the road surface.

The process of FIG. 26 will be further explained. At the step S4007, the ECU 130 calculates the change θs of the vehicle inclination based on an accumulated pitching amount Pi, which is obtained through the integration of the pitching rate P. At the step S4008, the ECU 130 calculates the current inclined angle θ by adding the change θs of the inclined angle to the reference angle θi. At the step S4009, the ECU 130 calculates the initial presumed acceleration gxi at the start of the vehicle parking, based on the reference inclined angle θi. At the step S4010, the ECU 130 calculates the presumed acceleration gxp, which is presumed that the acceleration sensor 110 would detect when the vehicle is parked with the inclined angle θ. At the step S4011, the ECU 130 calculates a correction amount gxip for the initial acceleration based on the change θs of the vehicle inclination and the presumed acceleration gxp. The correction amount gxip for the initial acceleration is a cosine component (cos θs) of the initial presumed acceleration gxi. At the step S4012, the ECU 130 calculates the floor acceleration af based on the above acceleration signal gx, the presumed acceleration gxp, and the correction amount gxip for the initial acceleration. More exactly, the floor acceleration af is obtained by the following formula:

the floor acceleration $af = gx + gxp − gxip$

At the step S4013, the ECU 130 calculates the road surface acceleration a based on the floor acceleration af and the change θs of the vehicle inclination, namely by the following formula:

the road surface acceleration $a = af \times \cos \theta s$

At the step S4014, the ECU 130 calculates the vehicle travel distance based on the above road surface acceleration a, which is a distance of the vehicle carried away by the possible vehicle theft. At the step S4015, the ECU 130 outputs the warning signal and the information transmitting signal to the warning device 140 and the transmitting device 150, so that the information for the vehicle travel distance is transmitted from the transmitting device 150 to the outside terminal. When the process of the step S4015 is ended, the process goes back to the step S4000.

Figure 28:
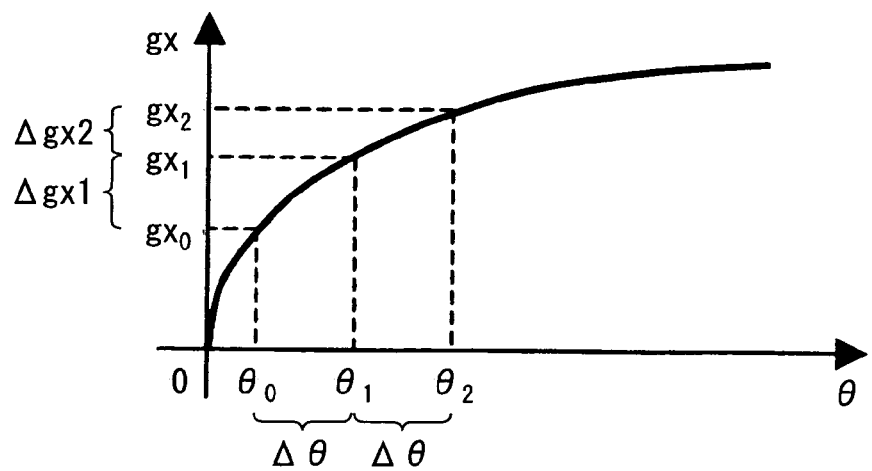
FIG. 28 is a graph showing a relation between a changed amount of the inclined angle and the acceleration signal from the acceleration sensor.

An advantage of this embodiment will be explained with reference to FIG. 28. A relation between the change θs of the vehicle inclination and Δgx is not in a linear relationship. For example, two cases are compared.

In the first case, the initial parking condition of the vehicle is that the road surface inclination is θ0 and the output signal gx of the acceleration sensor 110 is gx0. When the vehicle is inclined by the jack-up from the initial parking condition, for example, by the angle Δθ (θs=Δθ), the inclined angle θ of the vehicle with respect to the horizontal plane becomes θ1 and the output signal gx0 of the acceleration sensor 110 is changed to gx1.

In the second case, the initial parking condition of the vehicle is that the road surface inclination is θ1 and the output signal gx of the acceleration sensor 110 is gx1. When the vehicle is inclined by the jack-up from the initial parking condition, for example, by the angle Δθ (θs=Δθ), the inclined angle θ of the vehicle with respect to the horizontal plane becomes θ2 and the output signal gx1 of the acceleration sensor 110 is changed to gx2.

When compared the above two cases, the difference values of gx1−gx0 (Δgx1) and gx2−gx1 (Δgx2) are different from each other, in spite that the vehicle is jacked up by the same angle Δθ. In particular, when the vehicle is parked on the road surface, which is largely inclined with respect to the horizontal plane, the change Δgx of the acceleration signal gx becomes smaller (Δgx2<Δgx1). However, according to the above embodiment, in which the pitching sensor 180 is provided, the ECU 130 can determine the possible vehicle theft with a higher accuracy, irrespectively of the initial road surface (the reference inclined angle θi) at the vehicle parking.

When the acceleration sensor is provided to detect the acceleration in the plane parallel to the vehicle floor and the vehicle is moved with an inclined posture, the output signal of the acceleration sensor includes both of the acceleration generated by the vehicle inclination and the acceleration generated by the vehicle movement. The above two accelerations can not be separated into the respective acceleration components, if the acceleration sensor is alone used.

However, when the change θs of the inclined angle is detected by the pitching sensor 180, the road surface acceleration a can be calculated from the acceleration signal gx of the acceleration sensor 110. As a result, the vehicle travel distance is calculated based on the road surface acceleration a, and such calculated travel distance can be transmitted from the transmitting device 150 to the outside terminal, so that the vehicle travel can be easily traced. Furthermore, the current location of the vehicle may be presumed, when the output signal from the angular speed sensor 120 and the road surface acceleration a are used.

Ninth Embodiment

Figure 29:
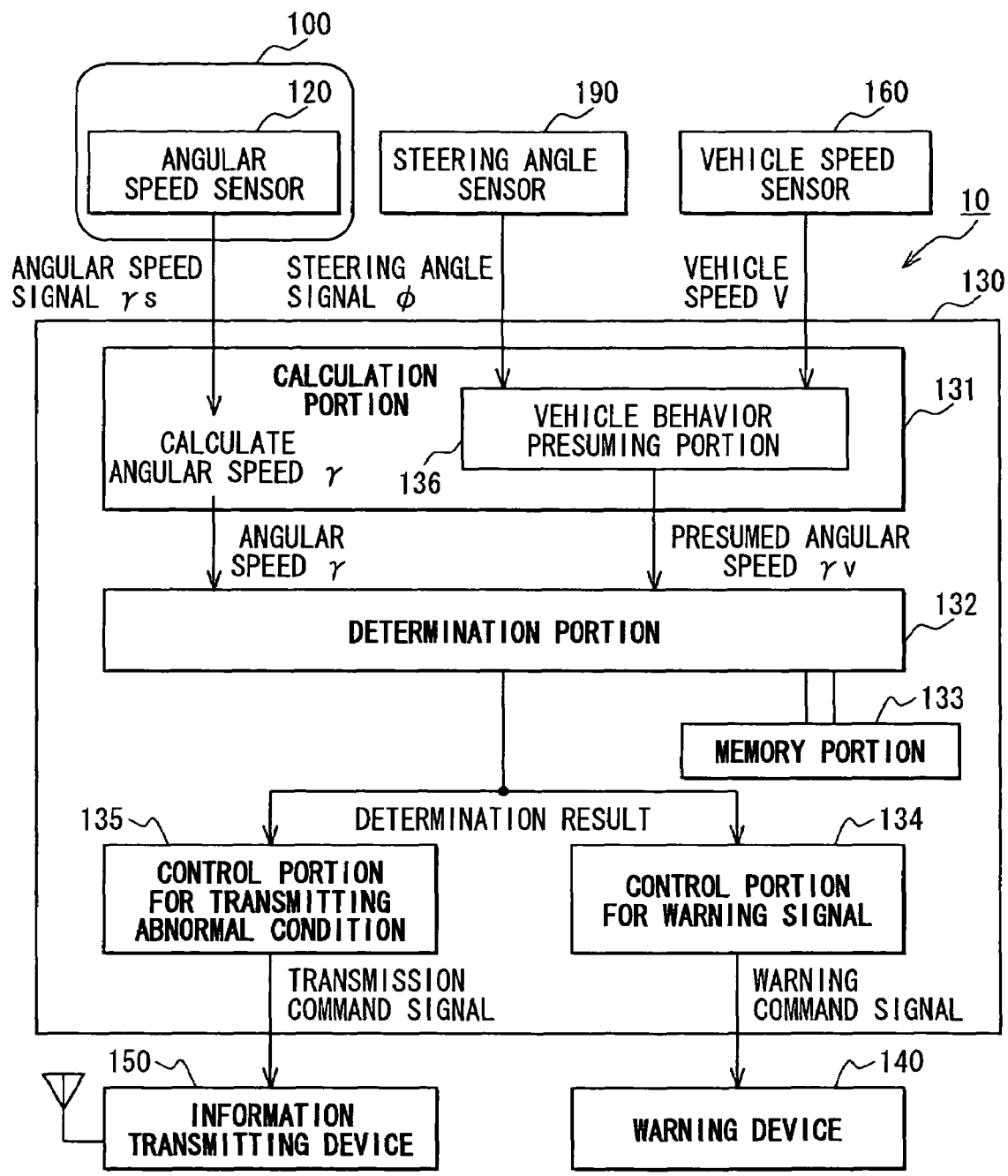
FIG. 29 is a block diagram for an antitheft apparatus according to a ninth embodiment.
Figure 30A:
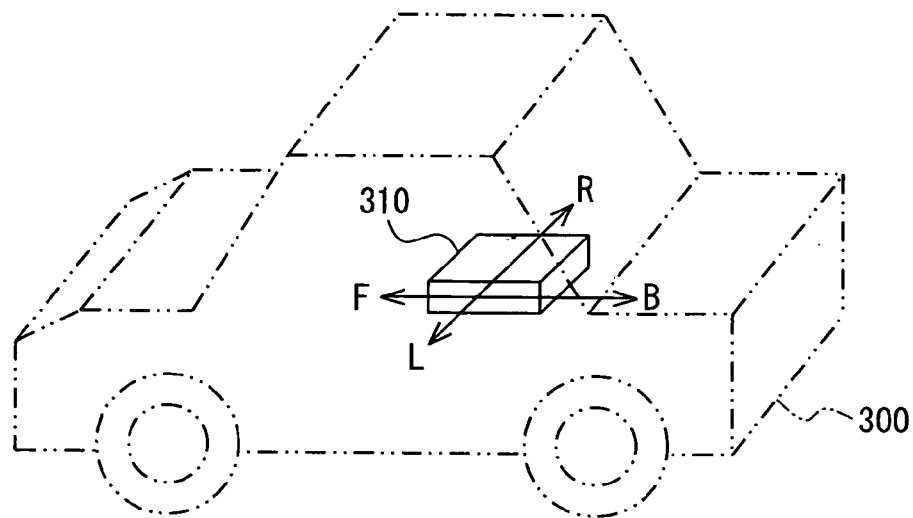
FIGS. 30A and 30B are explanatory views showing a method of detecting the inclination of the vehicle according to a conventional inclination sensor.
Figure 30B:
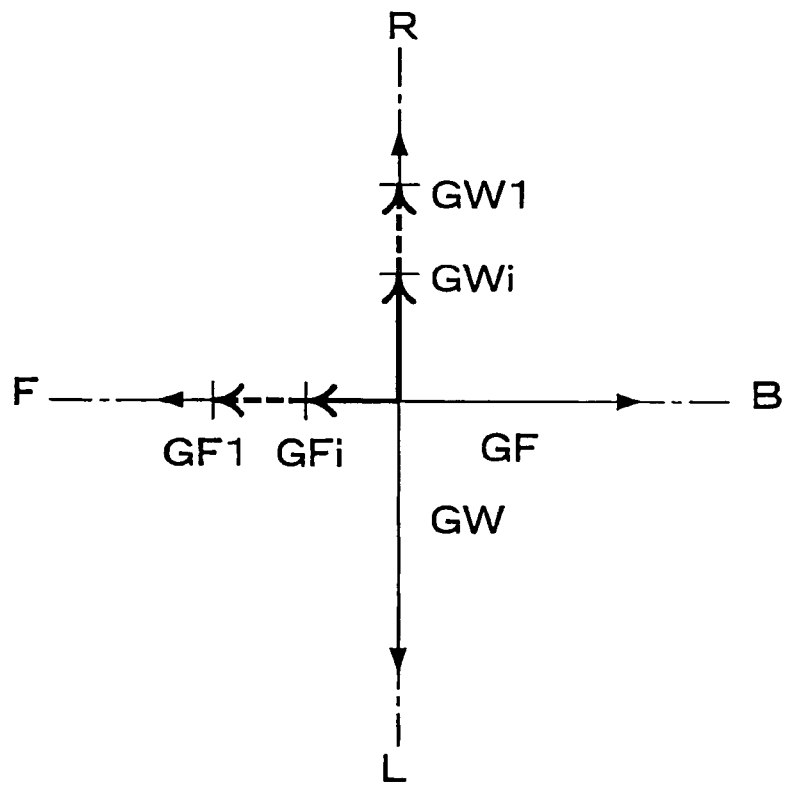

A ninth embodiment will be explained with reference to FIG. 29. This embodiment differs from the above embodiment (FIGS. 25 to 28) in that a vehicle speed sensor 160 and a steering angle sensor 190 are provided and a vehicle behavior presuming portion 136 is provided in the ECU 130. In FIG. 29, the same reference numerals designate the same or similar portion to the embodiment shown in FIGS. 25 to 28.

FIG. 29 shows a structure of the antitheft apparatus 10. An output signal (a steering angle) φ of the steering angle sensor 190 is inputted to the calculation portion 131 (the vehicle behavior presuming portion 136) of the ECU 130. The vehicle speed V detected at the vehicle speed sensor 160 is also inputted to the vehicle behavior presuming portion 136.

In the vehicle behavior presuming portion 136, a presumed angular speed γv is calculated by a vehicle behavior model, to which the steering angle φ as well as the vehicle speed V is inputted. For example, in case of a front drive vehicle having a steering device (Ackerman steering device), the angular speed γ is calculated in the following formula when parameters (the vehicle speed V and the steering angle φ are fixed:

$$\gamma = \frac{V \cdot \phi}{1 - \frac{m}{2l^2} \cdot \frac{l_j \cdot k_j - l_r \cdot k_r}{k_j \cdot k_r} \cdot V^2}$$

In the above formula, m is a mass of the vehicle, l is a wheel base, lf is a distance between a center of gravity and a center of front axis, lr is a distance between the center of gravity and a center of rear axis, kf is a cornering coefficient of the front wheel, kr is a cornering coefficient of the rear wheel. The vehicle behavior presuming portion 136 calculates the presumed angular speed γv in accordance with the above formula, wherein the output φ from the steering angle sensor 190 and the output V of the vehicle speed sensor 160 are applied to the formula.

The ECU 130 (the determination portion 132) determines the possible vehicle theft, when a difference amount between the presumed angular speed γv and the detected angular speed γ of the angular speed sensor 120 exceeds a predetermined value. More exactly, the ECU 130 does not determine the possible vehicle theft, when the detected angular speed γ is within a range of plus or minus 10% of the presumed angular speed γv, whereas the ECU 130 determines the possible vehicle theft when the detected angular speed γ is not within the above range.

If the exact vehicle behavior model could be applied for the calculation, the detected angular speed γ should become equal to the presumed angular speed γv. However, in the actual situation, in which the vehicle is jacked up and carried away, the detected angular speed γ would hardly coincide with the presumed angular speed γv. For example, in the case that the front wheels of the front drive vehicle are jacked up by the tow truck, the steering angle φ is not changed even when the tow truck turns. Therefore, the presumed angular speed γv is not generated. However, the angular speed γ is detected in this case. As a result, the ECU 130 can determine the possible vehicle theft.

In the case that the rear wheels of the rear drive vehicle are jacked up and carried away by the tow truck, the steering wheels (the front wheels) are locked up, unless an ignition key cylinder is rotated to a position of "ACC" or "ON". Therefore, the steering angle φ is not changed even when the tow truck turns, and the presumed angular speed γv is not generated. However, since the angular speed γ is also detected in this case, the ECU 130 can determine the possible vehicle theft, as in the same manner to the front drive vehicle.

In the above embodiment, the invention is explained for the vehicle having the Ackerman steering device. However, the invention is not limited to such vehicle behavior model having the Ackerman steering device.

The vehicle behavior model is usually applied to the vehicle behavior control system, such as VDIM system, and the ECU for the VDIM system receives detected signals from the steering angle sensor (190), the vehicle speed sensor (160), and the inertia sensor (100). Accordingly, the determination for the possible vehicle theft can be performed by the ECU for the VDIM system. In such a case, neither the ECU nor the wiring for connecting the ECU with the respective sensors is specifically necessary for the purpose of performing the determination of the vehicle theft.

Tenth Embodiment

A tenth embodiment will be explained. Although a specific drawing for the tenth embodiment is not shown, a structure of the antitheft apparatus is similar to any one of the structures of the above embodiments (e.g. the structure shown in FIG. 10). The antitheft apparatus (10) has an angular speed sensor (120), an electronic control unit (ECU) (130), a warning device (140), and a transmitting device (150). The antitheft apparatus (10) further has a sensor for detecting a position of an ignition key cylinder (hereinafter, also referred to as a position sensor).

In most of the vehicles, a key cylinder is rotated by a key from a position "OFF" to a position of "ON" or "ACC", so that an operation of an engine is started. In such a vehicle, a steering shaft is locked up when the key cylinder is at the "OFF" position. In the case that the rear drive vehicle is jacked up and transported by a tow truck, the locked condition for the front wheels is usually released to an un-locked condition. Otherwise, a lock device for the steering shaft would be broken down. Accordingly, in the case (other than a vehicle theft) that the vehicle is transported by the tow truck, the key cylinder is usually rotated from the "OFF" position to the "ACC" or "ON" position.

In the vehicle theft, since a criminal person does not have a key for a vehicle, the key cylinder is usually kept at the "OFF" position. As a result, an angular speed γ can be detected at the angular speed sensor (120) even when the key cylinder is in the "OFF" position.

According to this embodiment, therefore, the ECU (130) determines the possible vehicle theft, when the detected angular speed γ at the angular speed sensor (120) becomes larger than a predetermined value (a threshold amount) and the key cylinder is in the "OFF" position. The threshold amount for the angular speed γ is, for example, 1 deg/sec.

As above, the antitheft apparatus can be realized in a simple structure.

Other Embodiments

In the above embodiments (e.g. in FIGS. 11, 13, 17), the change θs of the vehicle inclination is calculated based on the output signal gx from the acceleration sensor 110, and the inclination of the vehicle is determined by the change θs of the inclined angle. The determination of the vehicle inclination is not limited to the above method. For example, an inclination speed may be calculated by performing the integration of the output signal gx (the acceleration) by one time, and the vehicle inclination may be determined based on this inclination speed, namely whether the inclination speed is higher (or lower) than a predetermined value.

For example, the ECU 130 may determine the possible vehicle theft when the calculated inclination speed is higher than the predetermined value, even in the case that the ignition switch is turned off. This determination method may be added to the above embodiments, so that the detection accuracy can be further improved.

In the above embodiments, the initial inclined angle of the vehicle at its parking (i.e. when the ignition switch is turned off) is used as the reference value (the reference inclined angle) θi. However, the reference inclined angle θi may be obtained by calculating an average amount of the inclined angles for a certain period, for example for one minute since the ignition switch is turned off. The certain period may be a different period of 30 seconds from a time point, at which a vehicle passenger gets off the vehicle. When the average amount is used as the reference inclined angle θi, high frequency noise, which will be caused by the wind, may be eliminated. Furthermore, the reference inclined angle θi may be renewed for every 30 minutes. It is hardly considered that a possible vehicle theft needs more than 30 minutes for jacking up the vehicle. Therefore, no adverse effect is generated, even when the reference inclined angle θi is renewed for every 30 minutes. In particular, when the vehicle is parked on a snow road, the vehicle inclination may be gradually changed. When the reference inclined angle θi is renewed for every 30 minutes, a possible erroneous determination for the vehicle theft can be suppressed, which would be otherwise possible because the vehicle inclination is changed due to melting of snow.

What is claimed is:

1. An antitheft apparatus for a vehicle comprising:
   an inertia sensor provided for an anti-lock braking system;
   an electronic control unit having a first control portion for determining whether there is a possible vehicle theft or not based on an output signal from the inertia sensor, and for outputting a vehicle theft signal when the first control portion determines the possible vehicle theft;
   a second control portion of the electronic control unit for receiving the vehicle theft signal from the first control unit portion, and for outputting a driving signal; and
   a warning device for raising an alarm indicating the possible vehicle theft, when the warning device receives the driving signal from the second control portion
   wherein the inertia sensor comprises an acceleration sensor for detecting acceleration in a direction on a plane parallel to a vehicle floor,
   wherein the first control portion calculates an inclined angle of a vehicle, based on the output signal from the acceleration sensor, and outputs the vehicle theft signal when the inclined angle is higher than a predetermined value,
   wherein the acceleration sensor comprises at least two detecting elements, each of which has its own detection direction in which acceleration is detected, and
   wherein one of the detection directions intersects with a vehicle longitudinal direction by a first angle, and the other detection direction intersects with the vehicle longitudinal direction by a second angle at an opposite side of the detection direction with respect to the vehicle longitudinal direction.

2. An antitheft apparatus according to claim 1, wherein the detection directions are arranged such that the detection directions are in parallel to a reference plane of the vehicle.

3. An antitheft apparatus according to claim 1, wherein the first angle and the second angle are identical to each other.

4. An antitheft apparatus according to claim 1, wherein each of the first angle and the second angle is 45°.

5. An antitheft apparatus according to claim 1, wherein one of the detection directions coincides with a diagonal line connecting a front right wheel and a rear left wheel, whereas the other detection direction coincides with a diagonal line connecting a front left wheel and a rear right wheel.

6. An antitheft apparatus according to claim 1, wherein the two detecting elements are mounted in a single semiconductor package.

7. An antitheft apparatus according to claim 1, wherein
the first control portion calculates acceleration generated in one of the detection directions based on a first detecting signal from one of the detecting elements,
the first control portion calculates acceleration generated in the other detection direction based on a second detecting signal from the other detecting element, and
the first control portion calculates a vehicle inclination based on the calculated accelerations in the detection directions.

8. An antitheft apparatus for a vehicle comprising
an inertia sensor provided for an anti-lock braking system;
an electronic control unit having a first control portion for determining whether there is a possible vehicle theft or not based on an output signal from the inertia sensor, and for outputting a vehicle theft signal when the first control portion determines the possible vehicle theft;
a second control portion of the electronic control unit for receiving the vehicle theft signal from the first control unit portion, and for outputting a driving signal; and
a warning device for raising an alarm indicating the possible vehicle theft, when the warning device receives the driving signal from the second control portion,
wherein the inertia sensor comprises an acceleration sensor for detecting acceleration in a direction on a plane parallel to a vehicle floor, and
wherein the first control portion calculates an inclined angle of a vehicle, based on the output signal from the acceleration sensor, and outputs the vehicle theft signal when the inclined angle is higher than a predetermined value,
wherein the first control portion calculates acceleration in a longitudinal direction of the vehicle based on the output signal from the acceleration sensor,
wherein the first control portion calculates the current inclined angle of the vehicle with respect to the horizontal plane, based on the acceleration detected by the acceleration sensor,
wherein the first control acceleration sensor calculates a change of the inclined angle of the vehicle, based on a reference inclined angle and the current inclined angle,
wherein the first control acceleration sensor determines that the vehicle is in a possible vehicle theft, when the change of the inclined angle is larger than a predetermined value; and
wherein the second control portion outputs the driving signal to the warning device.

9. An antitheft apparatus according to claim 8, wherein the reference inclined angle corresponds to an inclined angle of the vehicle when the vehicle is parked.

10. An antitheft apparatus for a vehicle comprising:
an inertia sensor provided for an anti-lock braking system;
an electronic control unit having a first control portion for determining whether there is a possible vehicle theft or not based on an output signal from the inertia sensor, and for outputting a vehicle theft signal when the first control portion determines the possible vehicle theft;
a second control portion of the electronic control unit for receiving the vehicle theft signal from the first control unit portion, and for outputting a driving signal; and
a warning device for raising an alarm indicating the possible vehicle theft, when the warning device receives the driving signal from the second control portion,
wherein a vehicle speed sensor is provided for detecting a rotational condition of wheels, which are in contact with a road surface when the vehicle is jacked up,
wherein the first control portion calculates the rotational condition of the wheels, based on an output signal from the vehicle speed sensor, and
wherein the first control portion outputs the vehicle theft signal, when the calculated result for the rotational condition of the wheels is higher than a predetermined value.

11. An antitheft apparatus according to claim 10, wherein the first control portion calculates a vehicle speed, based on an output signal from the vehicle speed sensor, and
the first control portion outputs the vehicle theft signal, when the calculated vehicle speed is higher than a predetermined value.

12. An antitheft apparatus according to claim 10, wherein the first control portion calculates a vehicle travel distance, based on an output signal from the vehicle speed sensor, and
the first control portion outputs the vehicle theft signal, when the calculated vehicle distance is higher than a predetermined value.

13. An antitheft apparatus for a vehicle comprising:
an inertia sensor provided for an anti-lock braking system;
an electronic control unit having a first control portion for determining whether there is a possible vehicle theft or not based on an output signal from the inertia sensor, and for outputting a vehicle theft signal when the first control portion determines the possible vehicle theft;
a second control portion of the electronic control unit for receiving the vehicle theft signal from the first control unit portion, and for outputting a driving signal; and
a warning device for raising an alarm indicating the possible vehicle theft, when the warning device receives the driving signal from the second control portion,
wherein the inertia sensor comprises an angular speed sensor for detecting angular speed around an axis, which is perpendicular to a vehicle floor,
wherein the angular speed sensor outputs an angular speed signal,
wherein a steering angle sensor and a vehicle speed sensor are provided for respectively detecting a steering angle and a vehicle speed,
wherein the first control portion has a vehicle behavior model for presuming a vehicle behavior,
wherein the first control portion calculates a presumed angular speed by applying the detected steering angle and the vehicle speed to the vehicle behavior model, and
wherein the first control portion outputs the vehicle theft signal, when a difference value between the presumed angular speed and the detected angular speed is larger than a predetermined value.

14. An antitheft apparatus for a vehicle comprising:
an inertia sensor provided for an anti-lock braking system;
an electronic control unit having a first control portion for determining whether there is a possible vehicle theft or not based on an output signal from the inertia sensor, and for outputting a vehicle theft signal when the first control portion determines the possible vehicle theft;
a second control portion of the electronic control unit for receiving the vehicle theft signal from the first control unit portion, and for outputting a driving signal; and
a warning device for raising an alarm indicating the possible vehicle theft, when the warning device receives the driving signal from the second control portion,
wherein the inertia sensor comprises an angular speed sensor for detecting angular speed around an axis, which is perpendicular to a vehicle floor,
wherein the angular speed sensor outputs an angular speed signal,
wherein a key cylinder controls a steering lock device, and
wherein the first control portion outputs the vehicle theft signal, when the steering lock device is in its locked position, and when the angular speed is larger than a predetermined value.

* * * * *